United States Patent
Pekonen et al.

(10) Patent No.: US 8,291,448 B2
(45) Date of Patent: Oct. 16, 2012

(54) PROVIDING ZAPPING STREAMS TO BROADCAST RECEIVERS

(75) Inventors: Harri Pekonen, Raisio (FI); Miska Hannuksela, Ruutana (FI); Toni Paila, Stamford, CT (US); Dominique Müller, Dachsen (CH)

(73) Assignee: Nokia Corporation, Espoo (FI)

( * ) Notice: Subject to any disclaimer, the term of this patent is extended or adjusted under 35 U.S.C. 154(b) by 495 days.

(21) Appl. No.: 11/662,401

(22) PCT Filed: Sep. 15, 2005

(86) PCT No.: PCT/US2005/032825
§ 371 (c)(1),
(2), (4) Date: Oct. 9, 2007

(87) PCT Pub. No.: WO2006/031925
PCT Pub. Date: Mar. 23, 2006

(65) Prior Publication Data
US 2008/0216116 A1    Sep. 4, 2008

Related U.S. Application Data

(60) Provisional application No. 60/609,840, filed on Sep. 15, 2004.

(51) Int. Cl.
*H04N 7/10*    (2006.01)
*H04N 7/025*    (2006.01)

(52) U.S. Cl. .................................................. 725/32

(58) Field of Classification Search .................. None
See application file for complete search history.

(56) References Cited

U.S. PATENT DOCUMENTS

| 6,257,045 | B1 | 7/2001 | Hosokawa et al. |
| 6,452,611 | B1 * | 9/2002 | Gerba et al. ................ 715/721 |
| 6,625,222 | B1 * | 9/2003 | Bertonis et al. ............ 375/259 |
| 6,675,385 | B1 * | 1/2004 | Wang ........................... 725/39 |

(Continued)

FOREIGN PATENT DOCUMENTS

| EP | 0 844 766 | 5/1998 |
| EP | 1 389 874 A2 | 2/2004 |
| EP | 1 793 590 A1 | 6/2007 |
| WO | WO 99 63727 | 12/1999 |
| WO | WO 03/073753 A1 | 9/2003 |

OTHER PUBLICATIONS

Digital Video Broadcasting (DVB); DVB-H Implementation Guideline, DVD, 17A Ancienne Route 1218 Grand Saconnex, Geneva Switzerland, Jan. 2004, XP040408167.

(Continued)

*Primary Examiner* — Nasser Goodarzi
*Assistant Examiner* — An Nguyen
(74) *Attorney, Agent, or Firm* — Ditthavong Mori & Steiner, P.C.

(57) ABSTRACT

Methods and systems for providing zapping data for one or more programs transmitted using timeslicing are disclosed herein. Zapping data may be provided by a zapping data provider or server, or may be created at the mobile terminal based on received program information. Zapping data may be provided to mobile terminals via a wireless multicast network, such as a DVB-H network, using a variety of timeslicing techniques, including providing a separate zapping data stream, providing zapping data as part of the source stream, or allowing mobile terminals to derive zapping data from the source content's broadcast stream. Zapping images may be selected from I-frames of video transmissions. An IP encapsulator may synchronize broadcast streams such that I-frames are transmitted concurrently, and at the beginning of timeslice bursts.

43 Claims, 21 Drawing Sheets

U.S. PATENT DOCUMENTS

| | | | |
|---|---|---|---|
| 6,714,264 | B1 | 3/2004 | Kempisty |
| 6,792,449 | B2 | 9/2004 | Colville et al. |
| 7,091,968 | B1* | 8/2006 | Ludvig et al. ............... 725/39 |
| 7,270,730 | B2* | 9/2007 | Schroeder et al. ....... 204/403.01 |
| 7,373,652 | B1* | 5/2008 | Bayrakeri et al. ............. 725/53 |
| 2002/0054062 | A1* | 5/2002 | Gerba et al. ................ 345/716 |
| 2002/0183070 | A1* | 12/2002 | Bloebaum et al. ............ 455/456 |
| 2003/0009765 | A1* | 1/2003 | Linden et al. ................ 725/95 |
| 2003/0159157 | A1 | 8/2003 | Chan |
| 2004/0034863 | A1* | 2/2004 | Barrett et al. ................ 725/38 |
| 2004/0244037 | A1* | 12/2004 | Yamaguchi et al. ........... 725/37 |
| 2005/0265374 | A1 | 12/2005 | Pelt |
| 2007/0074264 | A1* | 3/2007 | Vesma et al. ................ 725/135 |

OTHER PUBLICATIONS

European Office action for corresponding EP App. No. 05797524.5-2202 dated Mar. 29, 2010, pp. 1-4.

Extended European search report for corresponding EP App. No. 05797524.5-2202 dated Jul. 27, 2009, pp. 1-8.

IPDC in DVB-H: Technical Requirements CBMS1026 v1.0.0 Rev. 1/TM 3095 Rev.2, Inernet Citation, Jun. 23, 2004, XP002990830.

European Office action for corresponding EP App. No. 05797524.5-2202 dated Dec. 21, 2010, pp. 1-6.

\* cited by examiner

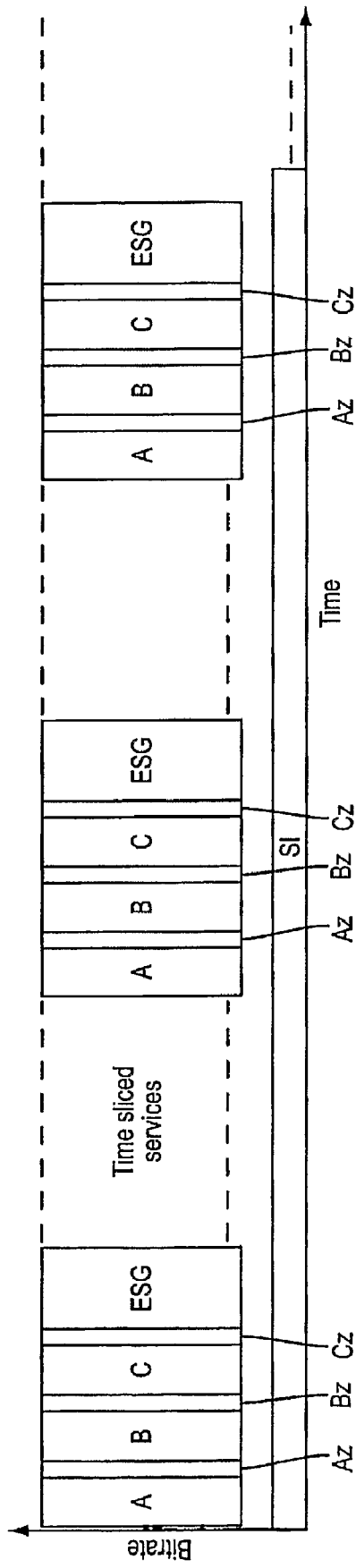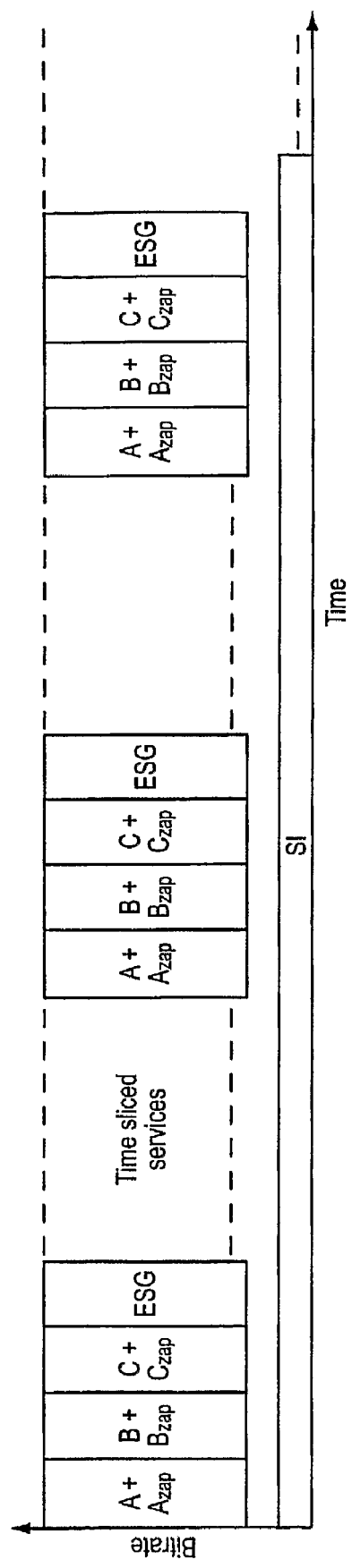

PROVIDING ZAPPING STREAMS TO BROADCAST RECEIVERS

This application claims priority to provisional U.S. application Ser. No. 60/609,840, filed Sep. 15, 2004, having the title "Method To Provide Zapping Stream To Broadcast Receivers," herein incorporated by reference in its entirety for all purposes.

FIELD OF THE INVENTION

The invention relates generally to mobile telecommunications networks. More specifically, the invention provides methods and systems to provide zapping stream information to receivers to allow fast channel switching.

BACKGROUND OF THE INVENTION

In conventional television broadcasting, whether programs are sent analog or digital, a user may quickly and easily change channels in order to see what programs are transmitted on each channel, e.g., often referred to as zapping or channel surfing. In DVB-H (Digital Video Broadcasting— Handheld) the programs are sent using timesliced IPDC (Internet Protocol Datacasting). The data of each program is sent in bursts usually using the entire or almost entire available bandwidth. The receiver portion of the DVB-H terminal is turned on only when the burst carrying the chosen program is transmitted. Between the bursts the receiver is turned off and the received (buffered) burst is rendered. Powering down between bursts saves considerable amounts of power in mobile devices with limited battery life. If the user wants to view another program broadcast, he or she has to wait until the burst carrying the desired program is transmitted. Because the time between bursts for each channel can be from a couple seconds up to 40 seconds or more, fast channel switching is not possible. Thus, it would be an advancement in the art to provide a method and system whereby users could easily and quickly change channels in a bursting broadcast environment.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to methods and systems for providing zapping data for one or more programs transmitted using timeslicing. In one illustrative method one or more data items are selected from one or more programs to be included in the zapping data, and one or more IP streams carrying zapping data are formed from the one or more programs to be included in the zapping data. The one or more IP streams carrying zapping data are then transmitted over a timeslice wireless broadcast or connection.

According to another illustrative aspect, a system for broadcasting program data and associated zapping data may include a transmitter for transmitting timesliced program data and zapping data. The transmitter selects zapping data from the program data, forms one or more data streams from the selected zapping data, and transmits the one or more data streams in one or more timesliced bursts. The system may also include a receiver for receiving timesliced program data and zapping data. The receiver receives the bursts of zapping data, processes the received zapping data, and displays at least part of the zapping data as a response to a user action.

According to another illustrative aspect of the invention, a receiving apparatus for receiving timesliced program data and zapping data may include a receiver for receiving bursts of said zapping data, a processor for processing the received zapping data, and a display on which at least part of said zapping data is displayed as a response to a user action.

Yet another illustrative aspect of the invention provides a transmitting apparatus for broadcasting program data and associated zapping data using timeslicing. The transmitting apparatus selects zapping data from the program data, forms one or more data streams from the selected zapping data, and transmits the one or more data streams in one or more timesliced bursts.

Still another illustrative aspect of the invention provides a display device for selecting, browsing and displaying received broadcast program data and zapping data. The displayed device includes a display capable of displaying visual data including video and still pictures included in the received data. The display device selects the visual data to be displayed, and provides a browsing mechanism for browsing the received zapping data. The selected data is displayed in the display as a response to a user action.

According to a further illustrative aspect, at least parts of zapping data may be included as part of an electronic service guide or its versions or fragments.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 17 illustrates data in a time slice sequence according to an illustrative aspect of the invention.

FIG. 18 illustrates data in a time slice sequence according to an illustrative aspect of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Figure 1:
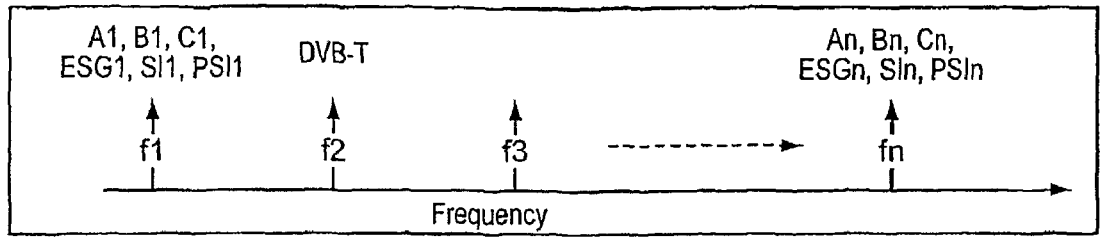
FIG. 1 illustrates channels in a wireless broadcasting network.

FIG. 1 illustrates physical channels (e.g., radio channels) f1, f2, f3 and fn in a frequency band used, e.g., for DVB transmissions. In the example frequency band, channel f1 may be used for timesliced IP datacasting (IPDC) transmissions. On frequency f1 a number of IP services, or programs, may be sent. Programs may be grouped into logical channels A1, B1, C1 each comprising one or more services, or programs. Additionally, Electronic Service Guide (ESG) data, Service Information (SI) data, and Program Specific Information (PSI) data may be transmitted on the same physical channel f1. As used herein, either the term service or program may be used to refer collectively to services and programs.

Figure 2:
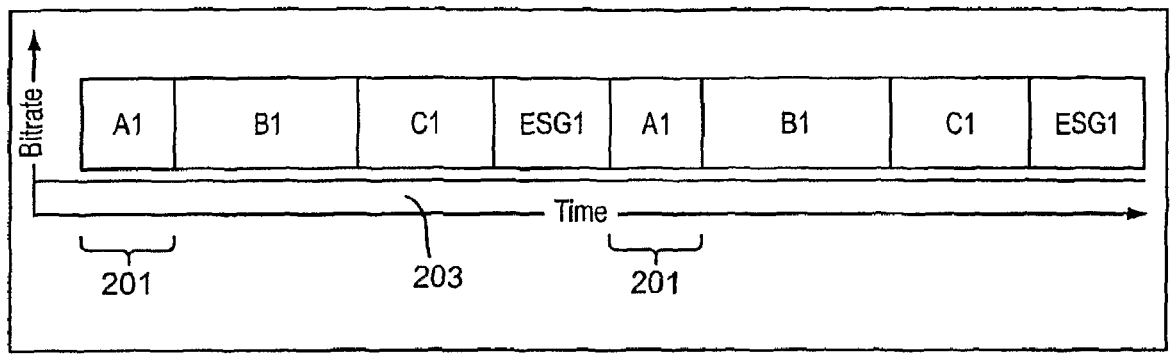
FIG. 2 illustrates data in a time slice sequence according to an illustrative aspect of the invention.

FIG. 2 illustrates timesliced transmissions on a sample frequency, here f1, in a simplified example. Each logical channel A1, B1 and C1 comprises one or more IP services, or programs. Data corresponding to one or more IP services of the logical channel may be transmitted as a single burst using all or most of the available bandwidth of the physical channel during that time slot. The logical channel may also be thought of or referred to as a timesliced channel. For receiving an IP service in a timesliced channel, e.g., A1, the receiver is turned on for the duration 201 of the burst carrying channel A1 data. The maximum burst duration is signaled in SI data 203. A time to next burst (delta-t), the end of the burst/frame, and any application data table and/or RS data table may be signaled as real-time parameters in the transmitted MPE section headers (not shown). A receiver receiving the transmission may filter the corresponding packets from the received burst in order to receive a selected program in the channel. In the example of FIG. 2, A1, B1 and C1 are timesliced elementary streams (timesliced channels) each comprising one or more IP services. An Electronic Service Guide (ESG) comprising information on the hierarchy and/or content of the services, transmission times and other service related information associated with the available services or programs of the timesliced channels A1, B1 and C1 may be transmitted as a separate burst, as illustrated in FIG. 2.

Because data in the ESG might not be descriptive enough for a user regarding the content of a program, or because the user wants to see at what point a program is presently being broadcast, the user decides to switch channels in rapid succession to learn what is being broadcast in other ongoing programs. This is also known as channel zapping. However, because the time between bursts for each channel can be up to 40 seconds or more, an illustrative aspect of the invention may provide zapping data to the receiver, which the user can review when desiring to rapidly see what is being broadcast on other channels. The zapping data may be consumed in the receiver by a client zapping application, or it may be consumed by the receiver via a zapping channel. Regardless of the format in which zapping data is presented, the zapping data presents to the user a view of ongoing programs being broadcast on a number of available channels. The zapping data may be derived from the current program on each channel which is included in the zapping data, as further described below.

In one illustrative embodiment of the invention, a separate zapping data stream (Az, Bz, Cz) may be formed and provided for each channel (A, B, C). In another illustrative embodiment, a zapping data stream may be provided on a channel, e.g., channel D (not shown in FIG. 2), and include data from more than one channel (e.g., A, B, C). The zapping data stream for channel D may include the zapping data from all zapping streams (Az, Bz, Cz), or the zapping data stream might only include selected parts of one or more zapping streams (Az, Bz, Cz).

Zapping stream(s) may be formed by copying selected frames (or other data) to the zapping stream as such. Alternatively, the zapping stream may be formed from selected frames or other data by editing or modifying the selected frames or other data, e.g., using compression. Each zapping stream delivers zapping information associated with a service while a user is performing fast channel browsing (zapping). Zapping data might include still images, video frames, operator logos, content provider logos, broadcaster logos, etc. Zapping stream data may be formatted in an intra-coded frame (I-frame) of any video coding algorithm, JPEG, or any other image or data format.

Figure 3:
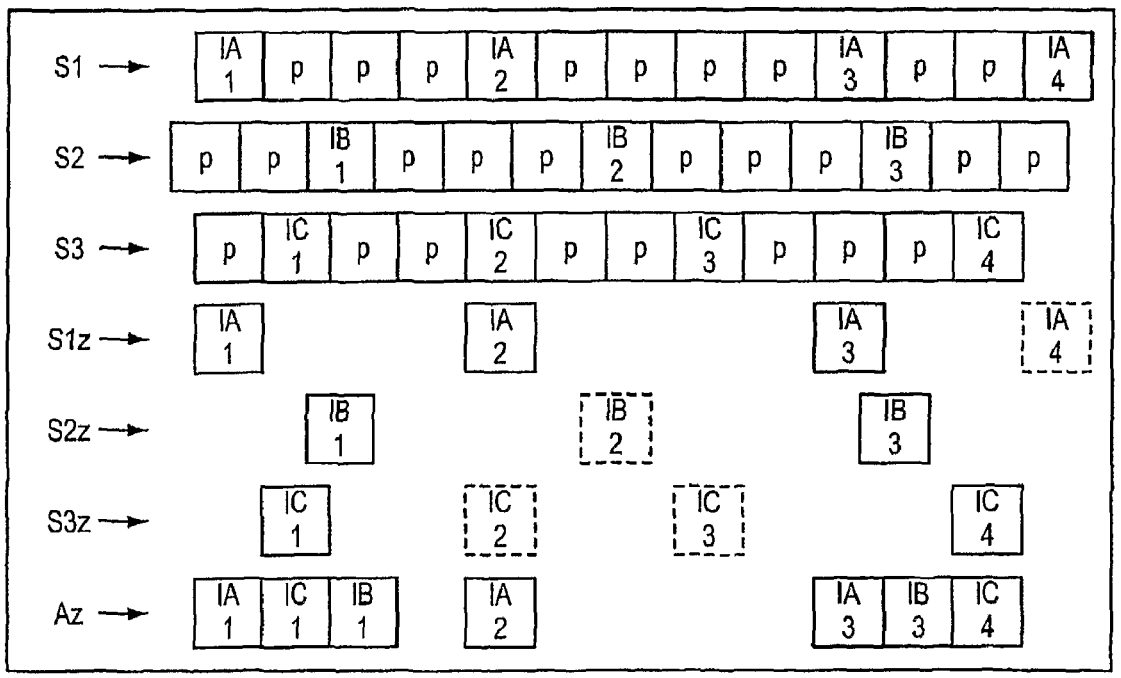
FIG. 3 illustrates selection of I-frames for use in a zapping stream according to an illustrative aspect of the invention.

According to an aspect of the invention, I-frames may be used as zapping data for video programs. I-frames may be identified from the broadcast stream, e.g., in MPEG-2 the Group of Pictures layer (GOP) data may be used. With reference to FIG. 3, the streams S1, S2 and S3 represent program streams (IP services) that may be transmitted in one timesliced channel, e.g., channel A. In the example in FIG. 3, streams S1, S2 and S3 are video streams comprising I-frames and inter-coded frames (p- and b-frames—for simplicity both p- and b-frames are shown with 'p'). The size of the (video) frame can differ from frame to frame. The program streams may include, in addition to the video data, other data such as, e.g., audio data, text data and/or image data that is part of the program or relating to the program. The program streams may also include data not related to the program (e.g. advertisements). In the example of FIG. 3, the zapping data is formed from I-frames of each program stream S1, S2, and S3. The zapping data may also include other data selected from each program stream S1, S2, and S3, if desired. The zapping data is preferably selected so that it is representative of the program carried in the corresponding program stream(s).

All or some of the I-frames of each stream may be selected to be included in the zapping data. The selection can be different from program to program, or consistent across streams and/or programs. In FIG. 3, lines S1z, S2z, and S3z represent zapping data selected from streams S1, S2, and S3. In the example of FIG. 3, the I-frames selected to be included in the zapping streams are illustrated with solid borders in streams S1z, S2z, and S3z, i.e., IA-1, IA-2, IA-3, IB-1, IB-3, IC1, and IC-4. I-frames IA-4, IB-2, IC-2, and IC-3 are not selected for inclusion in zapping data stream Az.

Upon creation of the zapping data stream Az, the zapping data may be transmitted in a variety of alternative ways. For example, zapping stream or zapping stream related information may be provided to receivers using: 1) non-timesliced transmissions, 2) in a separate All-Zap information transmission burst, 3) in a separate transmission burst of All-Zap information with ESG information, 4) in the same burst as the zapping data's corresponding program stream(s), 5) in a transmission burst immediately before or after the corresponding program stream, or 6) the receiver can create the zapping stream using received program broadcasts. In the first three alternatives, copies of the selected frames or other data (or 'edited' or modified data corresponding to the selected frames or other data) are transmitted. In the last three alternatives, the receiver must know or learn which frames are needed for setting up the zapping stream in the receiver.

An illustrative aspect of the invention provides a mechanism for switching from zapping mode (i.e., fast channel switching to learn program content) to a real-time viewing mode of a selected program, using the electronic service guide (ESG), as further described below. If and when the user wants to return to a program from which he/she changed to zapping mode, the receiver may be turned on for receiving real-time parameters on that current channel or program. The receiver needs to receive only one (correct) section to get the delta-t for the desired content, and can then be turned off using power control mechanisms. The receiver can thus keep track of the real-time parameters for returning to the original program.

Figure 4A:
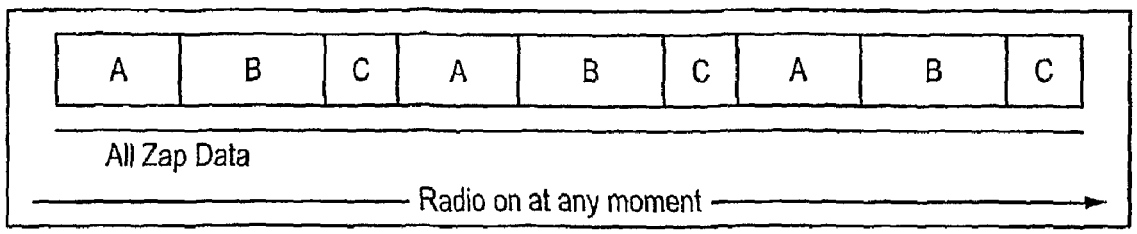
FIG. 4A illustrates a prior art method of providing zap data in a time sliced wireless broadcasting network.
Figure 4B:
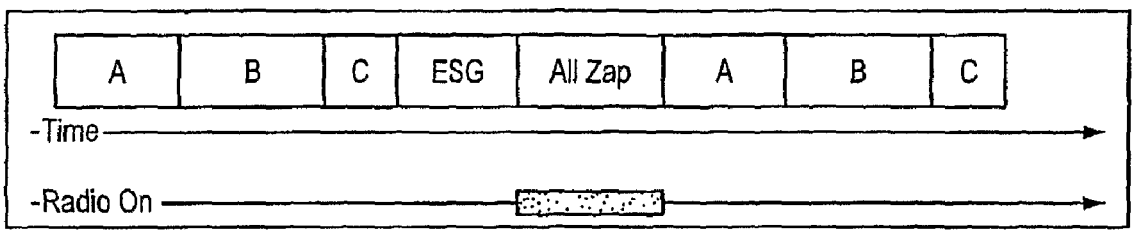
FIG. 4B illustrates a method for providing zap data in a time sliced wireless broadcasting network according to an illustrative aspect of the invention.
Figure 4C:
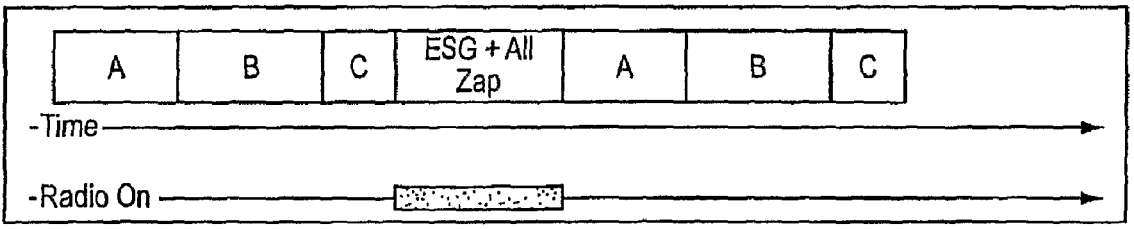
FIG. 4C illustrates a method for providing zap data in a time sliced wireless broadcasting network according to an illustrative aspect of the invention.

In various alternatives the receiver may be turned on for different time periods as shown in FIGS. 4A-4F. In FIG. 4A, the receiver is turned on at any moment to receive All Zap data which is continuously broadcast. In FIG. 4B, the receiver is turned on during an All Zap transmission burst to receive zap data for channels (or programs) A, B, C. The receiver can tune to a desired program by accessing the ESG data. In FIG. 4C, the receiver may be turned on during the 'ESG+All zap' burst. Because ESG data is received in addition to zapping data, the receiver can be tuned to the desired program using data from the ESG.

Figure 4D:
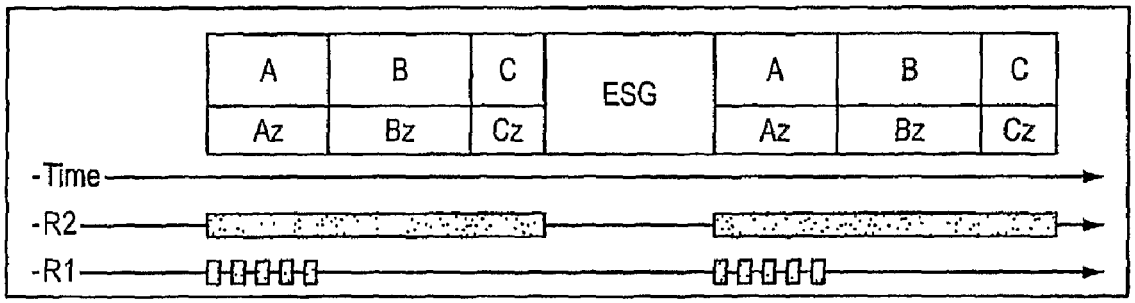
FIG. 4D illustrates a method for providing zap data in a time sliced wireless broadcasting network according to an illustrative aspect of the invention.
Figure 4E:
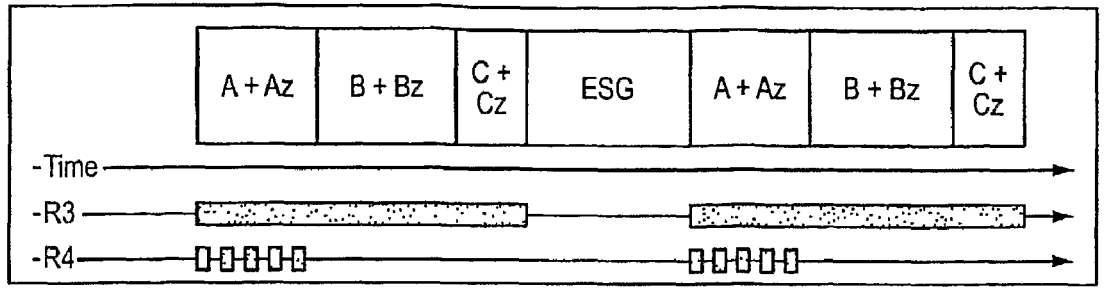
FIG. 4E illustrates a method for providing zap data in a time sliced wireless broadcasting network according to an illustrative aspect of the invention.
Figure 4F:
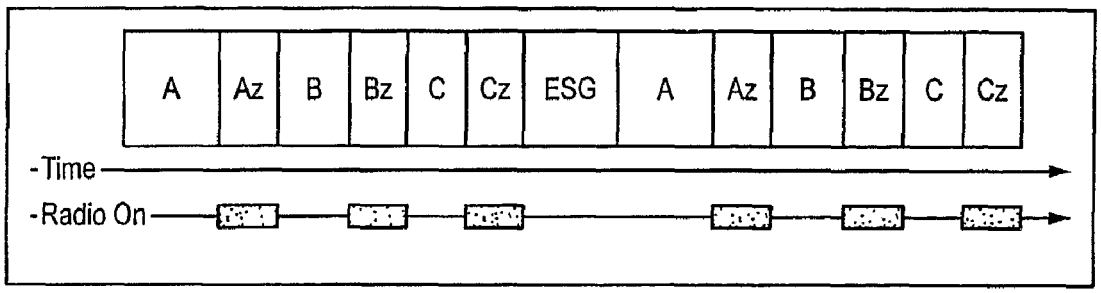
FIG. 4F illustrates a method for providing zap data in a time sliced wireless broadcasting network according to an illustrative aspect of the invention.

In FIG. 4D, the receiver may be turned on during one or more timeslice bursts, as in R1. If the receiver is turned on for the duration of all bursts, as in R2, the receiver can be 'tuned' to any program carried in the bursts. If the receiver is turned on for the duration of one burst, the programs carried in that burst can be accessed directly. Az, Bz, and Cz represent zapping data corresponding to channels A, B and C, respectively. In FIG. 4E, the receiver may be turned on during one or more timeslice bursts, as in R4. If the receiver is turned on for the duration of all bursts, as in R3, the receiver can be 'tuned' to any program carried in the bursts. If the receiver is turned on for the duration of one burst, the programs carried in that burst can be accessed directly. In FIG. 4F, the receiver may be turned on during one or more of the 'zap' bursts. The receiver can tune to a desired program by accessing the ESG to obtain the necessary access data.

Figure 5:
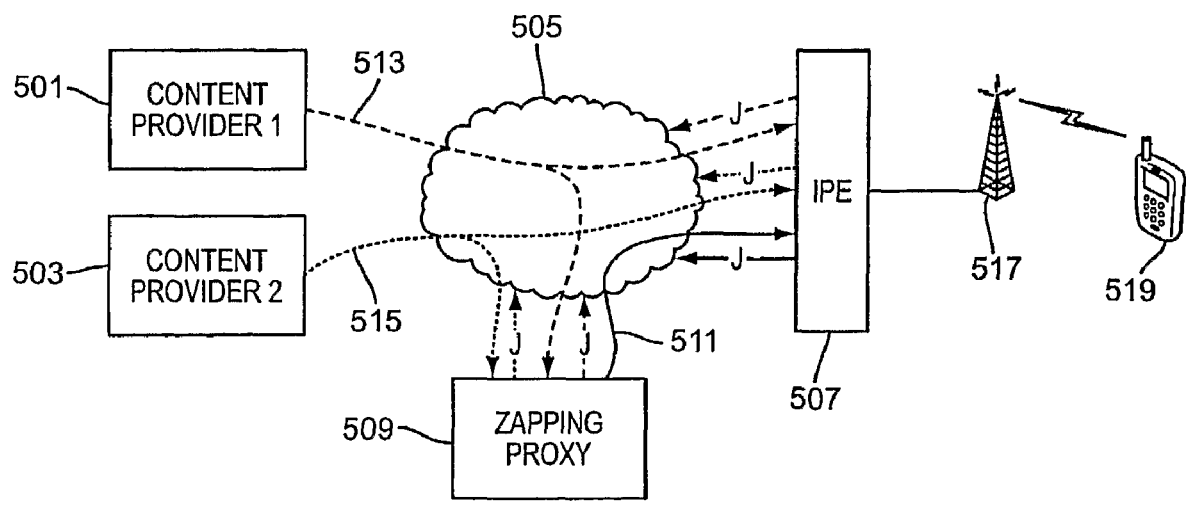
FIG. 5 illustrates a network architecture according to an illustrative aspect of the invention.

According to an alternative embodiment of the invention, with reference to FIG. 5, a zapping proxy server 509 may be used to produce a zapping stream 511. In FIG. 5, content providers 501, 503 (also referred to as content servers) provide broadcast transmissions 513, 515, respectively, to IP encapsulator 507, which encapsulates the streams for further broadcast transmission to one or more terminal devices 519 via wireless broadcast network 517, e.g., a DVB-H network. While FIG. 5 illustrates only a single mobile terminal 519, those of skill in the art will appreciate that each wireless network may in fact communicate with hundreds or thousands (or more) of mobile terminals. In addition to encapsulating the program streams 513, 515, IPE 507 may also receive the zapping data stream 511 from zapping proxy 509, and IPE 507 encapsulates stream 511 as well. Each of the IPE 507 and zapping proxy 509 may send a join request to the appropriate content provider in order to receive the applicable broadcast streams 513, 515, illustrated by the 'J' arrows having line weights corresponding to their associated broadcast streams. Network 505 may be any IP multicast core network architecture.

The zapping proxy 509 joins the IP services from which a zapping stream is desired, extracts the data selected for zapping data, e.g., I-frames, and creates a zapping stream. Using the zapping proxy 509, no modification is necessary to the stream encoders, making deployment easy and inexpensive. Zapping proxy 509 may be a functional element incorporated into a separate network node or integrated within a preexisting network node. Mobile terminal 519 incorporates a zapping client, which can interpret and display the zapping stream. The zapping client may be incorporated as a submodule of a broadcast receiver client, e.g., a DVB-H client application, or may be a separate client application.

According to various aspects, the zapping stream, e.g., I-frame stream, may be created by marking IP packets matching certain criteria, e.g., with a certain Type of Service (ToS in IPv4) or Differentiated Service (DiffServ in IPv6) value, and then incorporating those IP packets into the zapping stream. In this manner, no decapsulation is required, and the zapping proxy 509 is stream format agnostic. Another way to create the I-frame stream, where the zapping proxy knows the binding between I-frames and RTP packets, the zapping proxy decapsulates the UDP and RTP packets, assembles the I-Frames, and then reencapsulates the UDP and RTP packets.

The zapping proxy 509 is preferably controlled by the broadcast platform operator (i.e., the entity that creates the ESG), so as to be able to enforce zapping data rules, e.g., that each service does not exceed an allowed bitrate for the zapping stream. The zapping proxy 509 may be configured for each service for which a zapping data flow is generated. Configuration parameters may include: a designation of IP flows to join (normally 1 flow per service); how to detect I-frames (e.g., ToS value, DiffServ, "application-layer detection," etc.); IP multicast address and port to send the I-frames (normally 1 IP address for the whole zapping stream, and a different port number for each service's zapping flow); and the maximum rate at which I-frames can be sent. Other configuration may also or alternatively be used.

Zapping data streams (IP flows) can be carried on any timesliced burst (even the same timesliced burst as the service itself, as described above), but in an illustrative embodiment the zapping data streams may be part of the ESG timesliced channel. In this manner the power-saving capability of the mobile terminal is preserved. In order for the mobile terminal to filter the zapping IP flow of a certain service, the mobile terminal can distinguish the service, e.g., by IP multicast address, port number, or the like.

While the above description provides a thorough description of provisioning of zapping data, an illustrative implementation of zapping (switching from one "program," or IP stream, to another) in Digital Video Broadcasting for Handhelds (DVB-H) using Internet Protocol DataCasting (IPDC) will now be described in more detail. Zapping content forming transmission, reception and content usage are also described. A program may refer to an audio and/or video stream that is intended to be rendered simultaneously on the receiving device, i.e., in real-time.

With reference again to FIG. 5, network 517, e.g., a DVB-H network, utilizes at least two features to provide channel zapping: 1) time slicing, and 2) MPE-FEC. Time slicing is used due to high receiver power consumption and to allow for seamless handover. Time slicing is a concept of sending data for services in bursts, and signal receivers when bursts will arrive, thus providing a guaranteed 'off' period after each burst, during which the receiver can power down. Limits for the off period are from 0 to approximately tens of seconds. Receivers can then shut down between bursts to conserve power consumption. Power saving requirements often limit the smallest usable values for times between transmission bursts. The smaller the shut-down period, the lesser the power savings are achieved. Power savings may limit practical off period durations to longer than 1 second, resulting in an average channel zapping time that is longer than 0.5 seconds.

In addition, in order to maintain seamless handovers, there is a minimum limit for the shut-down period, because the receiver needs enough time to measure and tune to the new frequency after handover during the shut-down period. In case there are many frequencies to be measured, measurements can be divided into several shut-down periods, but each shut-down period is preferably long enough such that at least one measurement and synchronization can be performed during a single shut-down period. Typical values for receiver synchronization are in the range of 100's of milliseconds, and signal measurements are in the range of tens of milliseconds.

MPE-FEC refers to multiprotocol encapsulation forward error correction. An MPE-FEC frame is received at the mobile terminal before MPE-FEC decoding can take place. Typical burst durations for MPE-FEC frames are in the range of 100 ms, and typical decoding times may be in a range of tens or hundreds of milliseconds. Because channel zapping does not decrease receiver error resiliency, optional MPE-FEC decoding may be calculated during channel zapping.

A goal of the delta-t method is to signal the time from the start of the currently received MPE (or MPE-FEC) section to the start of the next burst. To keep the delta-t insensitive to any constant delays within the transmission path, delta-t timing information is preferably relative (e.g., "next burst will start 500 ms from the present time").

Delivering delta-t in the MPE (or MPE-FEC) section header removes the need to synchronize clocks between the transmitter and receiver. High flexibility is supported since parameters such as Burst Size, Burst Duration, Burst Bandwidth and Offtime may freely vary between elementary streams as well as between bursts within an elementary stream. The receiver might support sufficient accuracy for one Offtime only, as the clock is restarted by each burst. Within the MPE section header, a 6-byte field is allocated for the MAC address. The length of the used MAC address is signaled in the data_broadcast_descriptor inserted in the SDT or EIT. The minimum MAC address length is one byte, leaving up to five bytes for other use. Four of these five bytes are presently used for delivering Time Slicing and MPE-FEC real time parameters. This gives an additional benefit, as no bandwidth is required for delivering the parameters. According to the present standard, transmitting the above mentioned five bytes is mandatory regardless of whether they are used for the MAC address or not.

In the case of multicast IP streams the MAC address may be redundant data, as the MAC address is a function of the multicast group IP address. For all IP streams, the IP datagram header immediately following the MPE section header includes source and destination IP addresses uniquely identifying the IP stream. The receiver can either ignore the MAC address entirely, filter IP addresses only, or use the one byte MAC address to differentiate IP streams within the elementary stream. Even if hardware filtering within the demux is implemented on section level only, the IP layer would be able to filter any unused IP datagrams based on the IP addresses.

Streaming is synchronized to time slice bursts. Streaming video is preferably arranged in such a way that each burst starts with a random access point. If this is not provided, the receiver may not be able to start decoding video correctly right from the very first byte of the burst when the receiver tunes to a particular stream.

Video Coding. In hybrid video coders, an input video picture is divided, for processing purposes, into blocks of, for example, 16×16 pixels, called macroblocks. Each macroblock consists for example of blocks carrying processed sample values of one of three components: one luma component Y, and two chroma components Cb and Cr. One or more macroblocks can be combined to form a slice. The concept of slicing was developed to enable encoders to fit video data into the Maximum Transfer Unit (MTU) of a transmission channel. The use of slices breaks the in-frame prediction commonly used in hybrid video coders.

Video compression methods typically differentiate images on the basis of whether they do or do not utilize temporal redundancy reduction (that is whether they are predicted or not). Compressed images which do not utilize temporal redundancy reduction methods are usually called intra or I-frames. Intra frames are frequently introduced to prevent the effects of packet losses from propagating spatially and temporally. In broadcast situations, intra frames enable new receivers to start decoding the stream, that is, they provide "access points." Video coding systems typically enable insertion of intra frames periodically every n seconds. It is also advantageous to utilize intra frames at natural scene cuts where the image content changes so drastically that temporal prediction from the previous image is unlikely to be successful or desirable in terms of compression efficiency.

Compressed images which do utilize temporal redundancy reduction methods are usually called inter or P-frames. Inter frames employing motion-compensation are rarely precise enough to allow sufficiently accurate image re-construction and so a spatially compressed prediction error image is also associated with each inter frame. This represents the difference between the current frame and its prediction.

Reduction of temporal redundancies, in video, is achieved by predicting the current to-be-coded frame from previous or future picture frames. A frame used for this kind of prediction purposes is called a reference frame. Some of the coded frames in a sequence can, as a matter of the encoder's choice, not be used for prediction. These frames are termed non-reference frames. Slices belonging to non-reference frames are termed non-references slices, and slices belonging to the reference frames are called reference slices henceforth. In previous research, the use of non-reference frames has been shown to improve compression efficiency, as well as provide a mechanism of temporal scalability and make the coded video more robust to errors.

The H.264/AVC video coding standard allows the use of multiple reference pictures for motion compensation, i.e., there is a reference picture buffer containing multiple decoded pictures from which an encoder can select a reference picture for inter prediction on block basis. In addition to reference pictures, which are stored to the reference picture buffer, the H.264/AVC features non-reference pictures, which cannot be used as a prediction source for inter prediction. In contrast to earlier standards in which "disposable" pictures were always bi-directionally predicted inter pictures (B pictures), non-reference pictures in H.264/AVC can be of any coding type. Decoupling of decoding and output order of pictures enables conventional B-picture-like temporal scalability in H.264/AVC.

The H.264/AVC standard includes a sequence parameter set and a picture parameter set specified as follows. A sequence parameter set is a syntax structure containing syntax elements that apply to coded video sequences as determined by the content of a seq_parameter_set_id syntax element found in the picture parameter set. A picture parameter set is a syntax structure containing syntax elements that apply to zero or more entire coded pictures as determined by the pic_parameter_set_id syntax element found in each slice header.

An access unit in H.264/AVC is a set of syntax elements whose decoding results in a decoded picture.

An instantaneous decoding refresh (IDR) picture in the H.264/AVC standard is a coded picture in which all slices are intra-coded slices that causes the decoding process to reset the reference picture buffer. After the decoding of an IDR picture all following coded pictures in decoding order can be decoded without inter prediction from any picture decoded prior to the IDR picture.

In the following, I-frame refers to both IDR pictures and other intra-coded pictures, and B-frame refers to any non-reference picture.

By increasing receiver buffering it is possible to speed up zapping in IPDC. While receivers could receive several adjacent time slice channels, and thus the receiver would always have the next channel ready when a user is zapping through channels, that would also require MPE-FEC decoding for all the received channels. As a result, power consumption and receiver cost go up, both of which are critical parameters in the success of IPDC. It may not be presently feasible for receivers to be able to buffer and decode several MPE-FEC frames simultaneously. Also, if the receiver receives several time slice channels because of zapping, the order of the zapping would be then limited in a predetermined order.

Mobile TV is a new media and as such there is little research as to what constitutes a sufficient zapping time. Some general rules about response time, however, include the following: less than 0.1 seconds is generally perceived as instantaneous; a less than 1 second delay may be noticed but flow of thought is typically not interrupted; less than 10 second focus of attention kept in the dialogue; and if the delay is greater than 10 seconds, the user typically wants to perform other tasks while waiting.

A zapping time of less than 0.1 second is presently not possible because seamless handover measurement and tuning alone takes more than 0.1 second. Taking time slicing, MPE-FEC, receiver power consumption and receiver processing delays into account, 1 second is generally achievable, but power consumption and service distribution options are compromised. Ten seconds is easily achievable with little compromise of power consumption and service distribution options.

Based on the above, an illustrative aspect of the invention provides a user with the possibility to zap between channels so that it takes less than 0.1 second to provide and display a first still image in zapping mode and to receive the first updated "zapping" still image from a live stream in less than 1 second.

Providing zapping streams and audio-video (AV) stream synchronization is faster than DVB-H channel switching, and provides a more pleasant end-user experience. Providing a dedicated zapping channel speeds up switching from one program to another. That is, due to time-slicing, switching programs in conventional systems is slow (may take several seconds), and is undesirable from the end-user point of view. Zapping makes it easier to provide a nice user interface in receivers for program selection.

According to an aspect of the invention, no or very few changes are required in the receiver in any layer of the receiver protocol stack. Zapping software, hardware or firmware is easily implemented in the "server-side," i.e., in content servers and/or IP encapsulators. Zapping also provides a flexible solution so that an operator can decide how much capacity is used for speeding up zapping time and can decide on what the channel access times are to be.

Various user interfaces may be used in DVB-H receivers. According to an aspect of the invention, conventional program switching may be used, where one program is rendered full-screen or close-to-full-screen. The end-user selects the previous or next program, program number, or the program from the list of programs, and the selected program is rendered full-screen or close-to-full-screen as soon as possible.

According to illustrative another aspect, an electronic service guide (ESG) tree may be used. That is, a user zaps programs through the electronic service guide (ESG). The ESG may contain a still image, a video clip and possibly a text description of each stream as zapping information of transmitted programs. This information is stored in the receiver memory, and when the user zaps through programs, the corresponding still images, video clip and other information are rendered for the user from the receiver's memory. By having stored still images, the receiver can quickly render the first image for the user.

According to another illustrative aspect, a real-time program guide can be used. In such a scenario, when the end-user wants to browse multiple programs or select a new program to view, a mosaic, scroll bar, or other multi-picture live program guide is viewed. Pictures in the live program guide are updated frequently (e.g., as in a slideshow) and correspond to the actual program on each channel. The end-user may be able to highlight a program without actually tuning in, in which case the associated audio may also be played. The zapping program provides the content for the live program guide.

In prior art systems there is no way to direct the I-frames (or IP datagrams carrying I-frames, or parts of them) to a particular place in time slice bursts. In other words, the IP encapsulator (IPE) is not able to cut input data to bursts in such way that I-frames (or IP datagrams carrying I-frame data) would always be at the start of a burst. Another problem with previous solutions is that IP networks do not guarantee datagram throughput, nor do they guarantee to maintain the order of sent datagrams. Although in this document b-frames are not mentioned, some of the p-frames could be replaced with b-frames. As used herein, p-frame refers to p/b-frame, i.e., a frame that is predicted from the previous or following frame(s).

Figure 6:
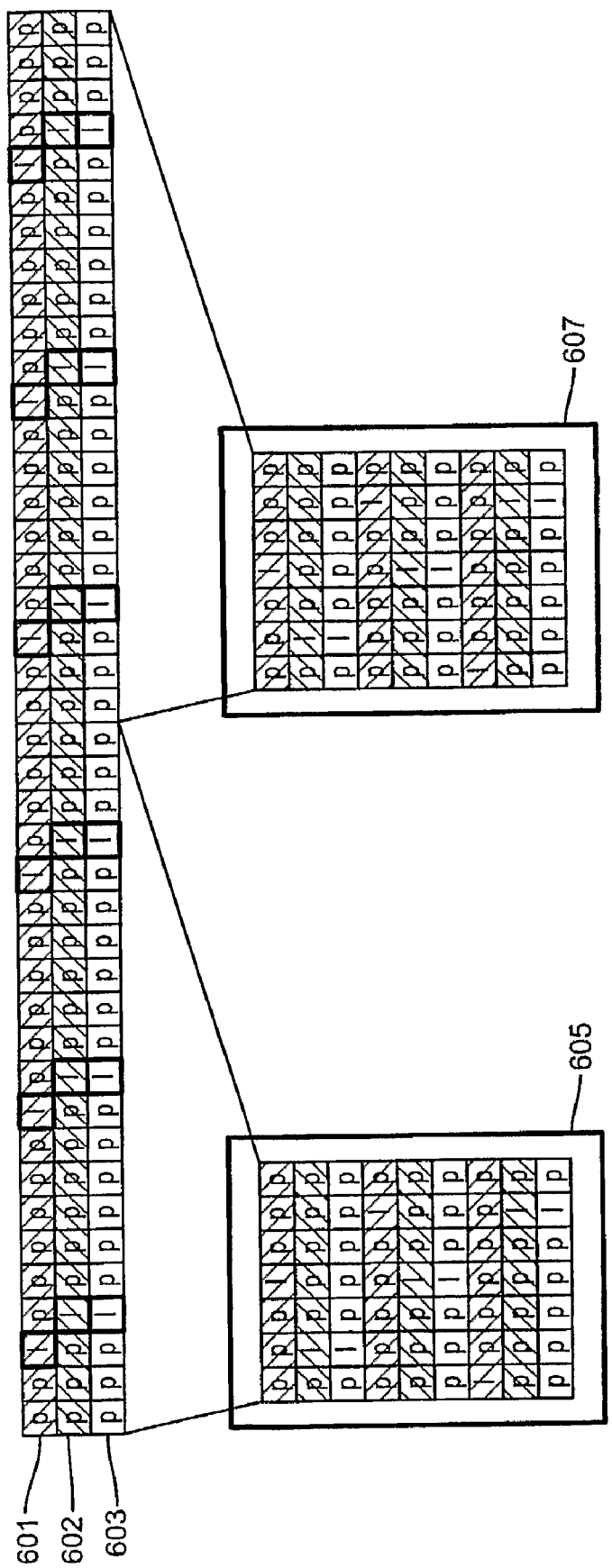
FIG. 6 illustrates a composition of stream data in time slice bursts according to an illustrative aspect of the invention.

FIG. 6 illustrates an example embodiment when no AV-stream and time slicing synchronization are used. In FIG. 6, I-frames are shown by the designation 'I' and have thick borders. P- and b-frames are represented by the designation 'p' and thin borders. In FIG. 6, the I-frames of source streams 601, 602, 603 are not synchronized compared to time slice bursts 605, 607. When a receiver enters to source for example stream 1, it will receive 2 p-frames before the first I-frame. This will cause the first 2 frames to be rendered to the user imperfectly or may be skipped altogether. By way of example, a typical frame rate for IPDC services could be 15 frames per second. Of these 15 frames there are typically 14 p- or b-frames (or other predicted frames) and one I-frame. Thus, there will be typically one I-frame per second. If no synchronization is provided the worst case would be that after the receiver has received the first burst there is still almost one second until the first correctly rendered figure can be shown to the user.

Figure 7:
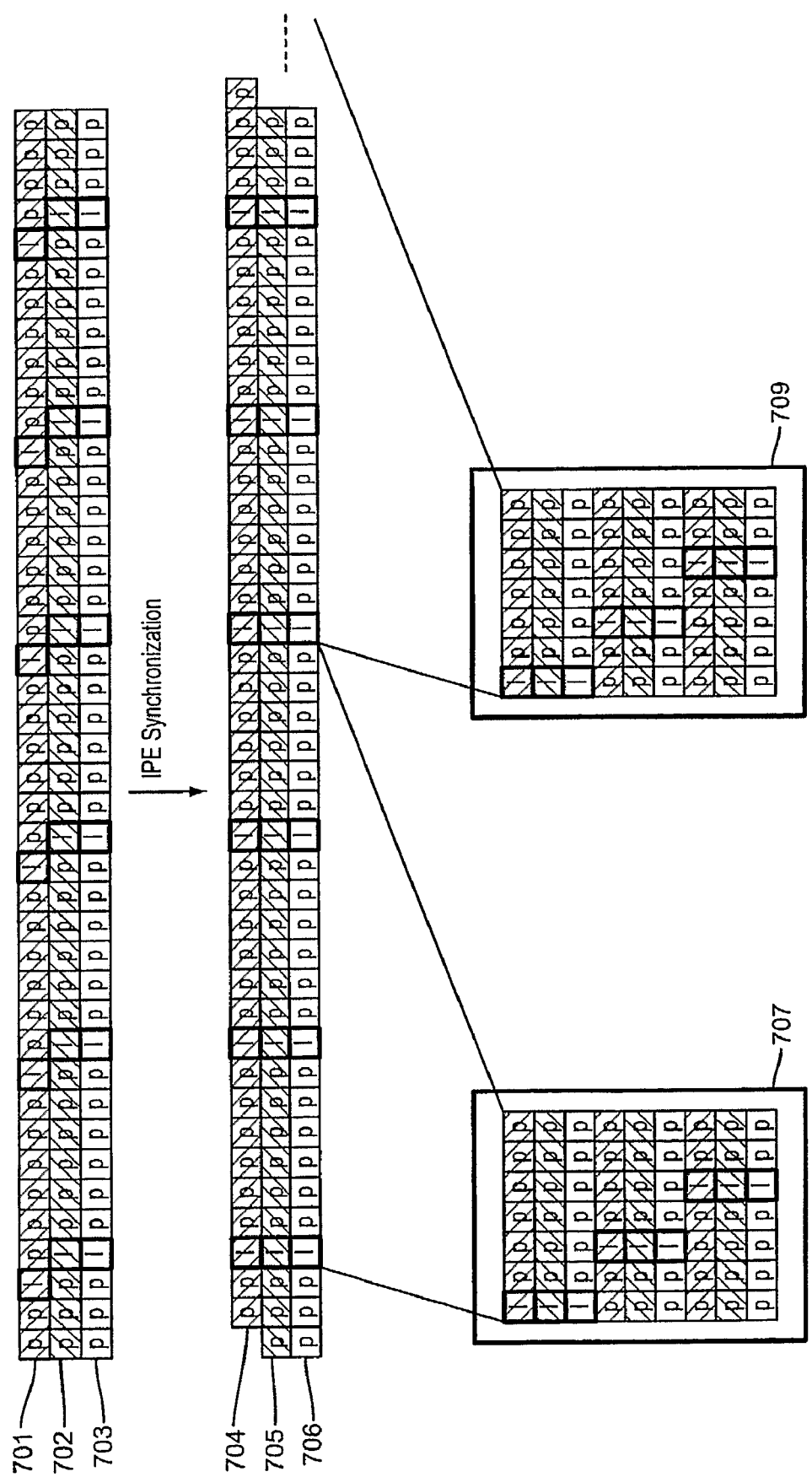
FIG. 7 illustrates a synchronized composition of stream data in time slice bursts according to an illustrative aspect of the invention.

As illustrated in FIG. 6, there may be a need to provide a mechanism such that IPE 507 (FIG. 5) can arrange time slice bursts so that preferably every burst starts with the IP datagram carrying I-frame data. FIG. 7 illustrates source streams 701, 702, 703 prior to any synchronization by IPE 507 (FIG. 5), and streams 704, 705, 706 after IPE 507 has synchronized the time slice bursts such that I-frames occur concurrently in each source stream. In FIG. 7, IPE has delayed source stream 1, and has adjusted burst start times to be immediately prior to or just before I-frames of all source streams. If the I-frames in any source stream 701, 702, 703 are not synchronized with the other source streams, then IPE 507 delays source streams as necessary to match up I-frames. IPE 507 may designate one source stream as the 'master' to which other source streams are synchronized. If different source streams have different I-frame rates, perfect synchronization might not be possible, and some imperfections in playback may occur.

Figure 8:
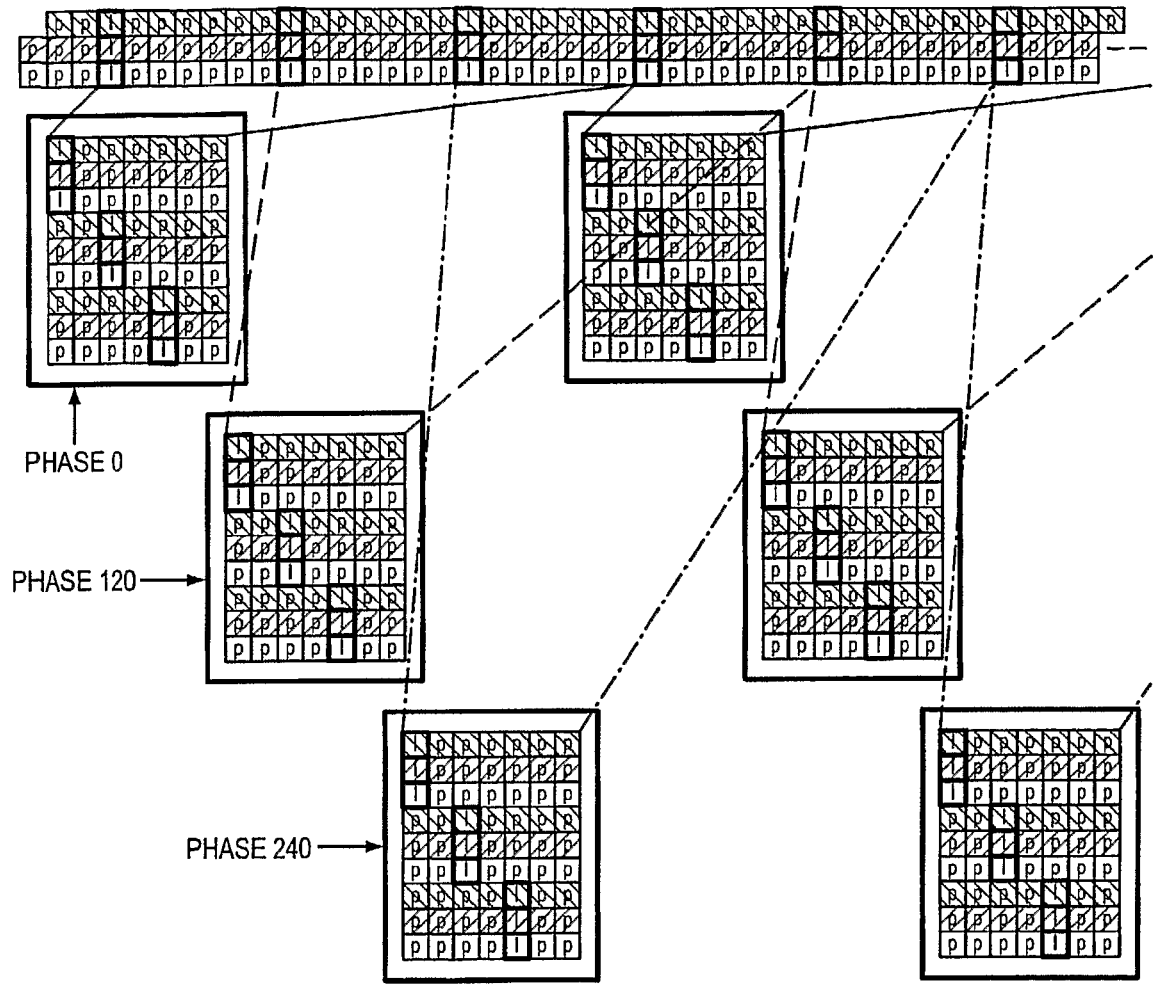
FIG. 8 illustrates a synchronized composition of stream data in time slice bursts according to an illustrative aspect of the invention.

When synchronization is applied in a network where asynchronous time slicing (as disclosed in U.S. patent application Ser. No. 10/237,404, filed Sep. 9, 2002, by Harri Pekonen, entitled Phase Shifted Time Slice Transmission To Improve Handover, herein incorporated by reference) is in use, there should be enough I-frames in each burst period so that there is an I-frame for each phase. For illustration, FIG. 8 provides an example of a network having three phases.

The IP encapsulator 507 may use the IPv6 flow label field to make IP datagram re-ordering decisions. In either a content server or in a video encoder device a flow label field in an IPv6 header can be used to indicate multiple flows of one video stream. Preferably one flow contains all predicted frames in-between two consecutive I-frames. In the case where the flow label field is used to indicate from which I-frames predicted frames are predicted, the IP encapsulator may re-order datagrams into the same order as they were sent from the sending server, negating the need for asynchronous time slicing. Asynchronous time slicing would still be needed in case there are IPv4 source streams used in the backbone network.

As an alternative to the flow label field of IPv6, one or more other field(s) in IPv4 or IPv6 can be used for identifying those datagrams that carry data relating to I-frames. In order to use the IPv6 flow label field, one first defines part of the flow label field to be an up/down counter that indicates the sequence of the transmitted frames. Several options that may be used include:

I-frame and all predicted frames before next I-frame have common value;

All predicted frames in-between two consecutive I-frames have common flow label value and I-frames have separate values;

Every frame has own value; and

Every predicted frame has own value.

Figure 9:
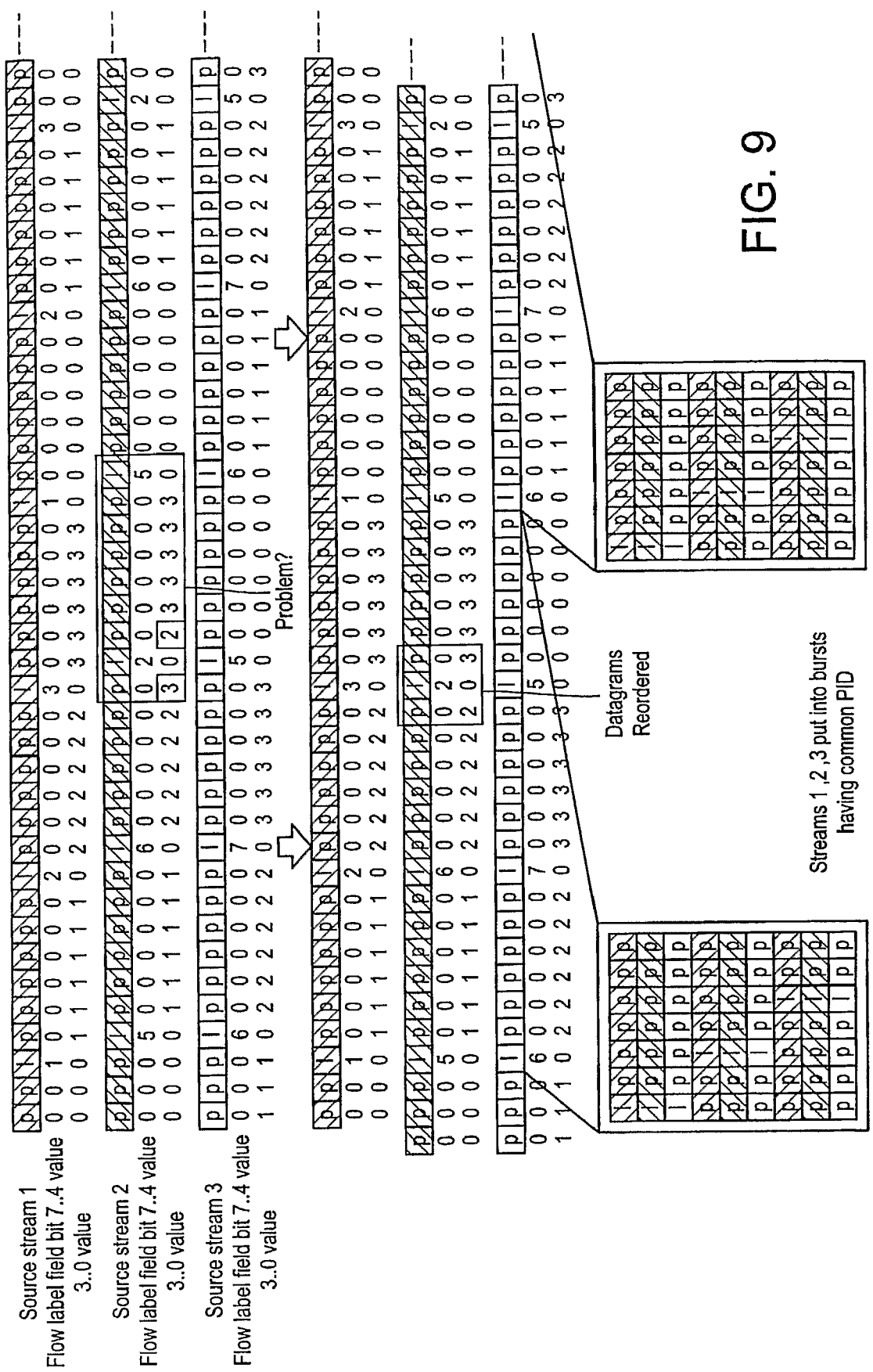
FIG. 9 illustrates a composition of stream data in time slice bursts according to an illustrative aspect of the invention.

The counter may be a modulo counter that starts from the beginning after reaching a predetermined maximum value. FIG. 9 illustrates IPv6 Flow Label Value field use, where datagrams are reordered, and where streams are placed into bursts having common Packet Identifier (PID) values. That is, IP datagrams might be inadvertently delivered in an order other than that in which they were sent (see 'Problem?' notation in FIG. 9). In such a scenario, the datagrams may be reordered back into a correct order prior to placing the datagrams into bursts for transmission to receivers.

Figure 10:
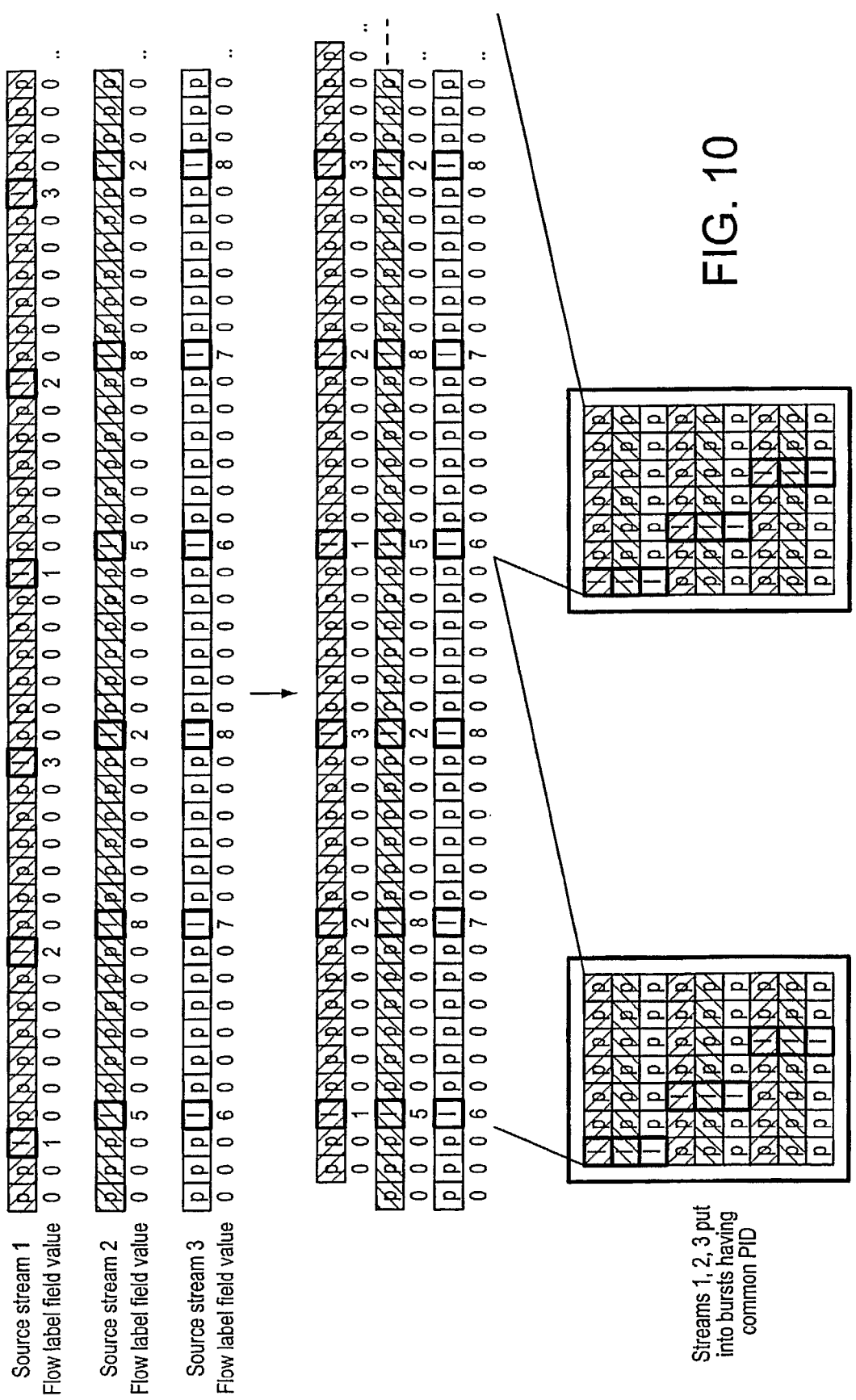
FIG. 10 illustrates a composition of stream data in time slice bursts according to an illustrative aspect of the invention.

The IPv6 flow label field may also be used for time slice synchronization. In a content server or in a video encoder device, a flow label field in IPv6 header may be used to indicate plural flows of one video stream. Preferably one flow contains all predicted frames and other flow(s) contain I-frames. One or several I-frame flows may be arranged to allow more detailed and flexible flow control. The IPE 507 may then detect I-frames and adjust time slicing and stream flows to be optimally synchronized. In order to use the IPv6 flow label field to perform time slice synchronization, each flow that contains predicted frames can have any value, as this flow does not require any special treatment. However, I-frame flow(s) preferably have a value other than 0x00. In addition, each separated I-frame flow preferably has a different flow label field value. FIG. 10 illustrates an example showing one possible configuration according to such an illustrative embodiment.

The IPE 507 (FIG. 5) uses the fact that when the flow label value is not 0x00, then that particular datagram contains I-frame information. The IPE 507 divides streams into bursts so that every burst starts with an I-frame with the same flow label value. In the example of FIG. 10, for source stream 1 the value is '1', for source stream 2 the value is '5' and for source stream 3 the value is '6'. It should be noted that any of the frames (I, B, P) may be transmitted in one or several IP datagrams, but most RTP payload formats disallow one IP datagram containing more than one (or part of one) frame. This provides several advantages, including the possibility to synchronize I-frames with burst starts, the possibility to re-order IP datagrams (carrying frames) before transmitting them to DVB-H bearers, and when having separate flows specified, a device that performs IPsec encrypting, could encrypt only some of the flows. IPv4 headers, however, do not have a flow label field defined. See IETF RFC 2460, herein incorporated by reference.

How zapping content may be transmitted as compared to service and ESG bursts and SI/PSI data will now be described, as well as at which protocol level zapping content is separated from original content or if separation is needed at all, as well as how zapping can be signaled from an encoder to the receiver. A receiver can separate zapping content from other content, and the terminal might receive only zapping content when the terminal is in zapping mode.

When selected zapping mode uses the multiplexing method, at least some of following parameters are preferably taken into account: receiver power consumption, channel switching time, receiver buffering requirements, receiver filtering and processing requirements, and air interface resources.

Six different zapping content multiplexing methods are presented below. Alternatively, other methods may be used. In FIGS. 11-18, A, B, and C are used to identify time sliced elementary streams. Each elementary stream may carry one or several IP services. Between the zapping stream/program and the ESG there may be an entry link so that the zapping stream/program is accessible via the ESG.

Figure 11:
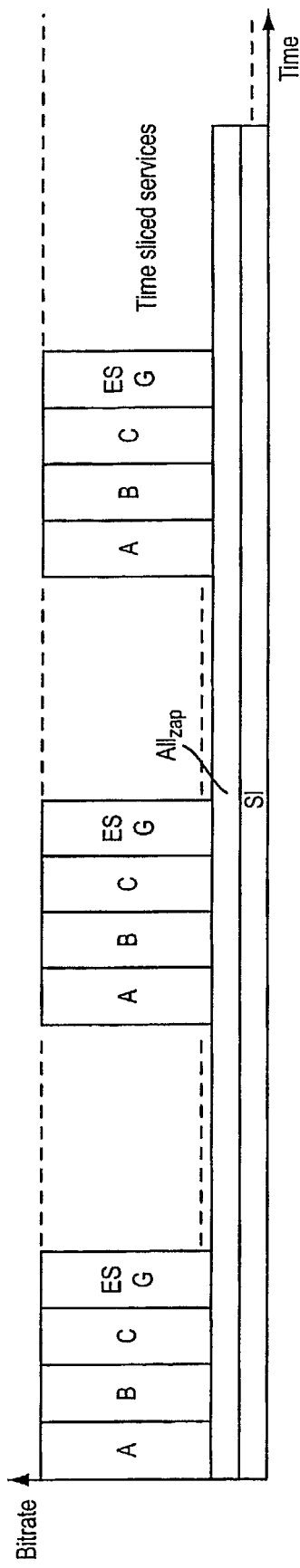
FIG. 11 illustrates data in a time slice sequence according to an illustrative aspect of the invention.

Different methods that require copying zapping content from original content are now described. Content copying also includes the possibility to modify content when it is copied from an original stream to a zapping stream. A first possible method uses a non-time sliced zapping stream. That is, one alternative to providing separate continuous zapping streams is to have one or more elementary stream(s) for zapping information. Elementary streams are logically separated from each other via a PID. FIG. 11 illustrates non-time sliced zapping content transmission. An advantage of using a non-time sliced zapping stream is that the transmitter can modify zapping content modifications prior to transmission.

Figure 12:
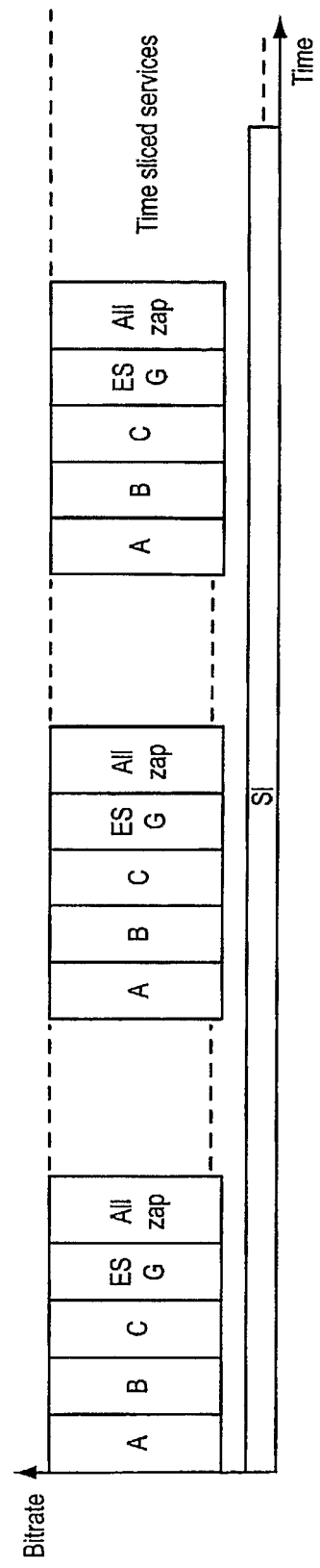
FIG. 12 illustrates data in a time slice sequence according to an illustrative aspect of the invention.
Figure 13:
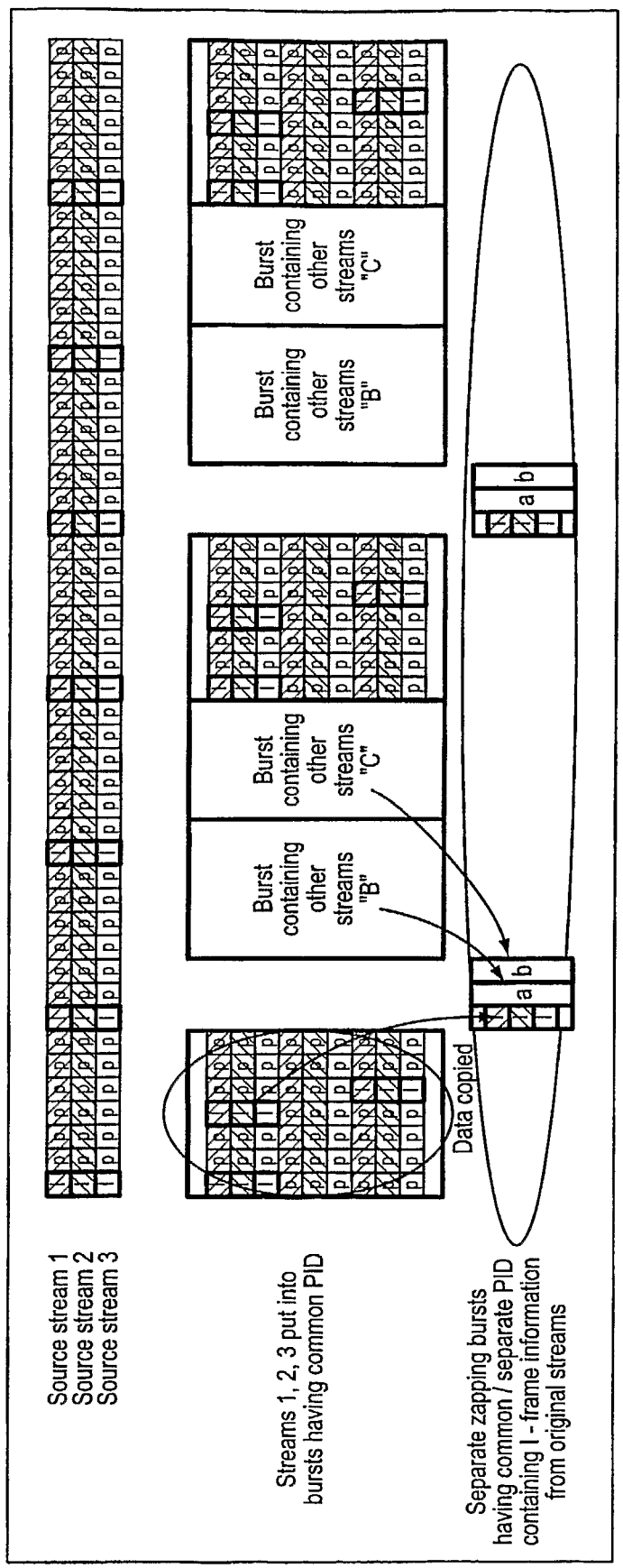
FIG. 13 illustrates a composition of stream data in time slice bursts according to an illustrative aspect of the invention.

A second possible method uses a dedicated zapping stream containing information from all available services. That is, an alternative to providing a separate time sliced zapping stream is to have one or more time sliced elementary stream(s) for zapping information, as illustrated in FIGS. 12-13. Elementary streams are logically separated from each other via a PID. FIG. 12 illustrates time sliced zapping content transmission in separate zapping bursts. Zapping channel bursts may be transmitted more frequently than actual service bursts, thereby allowing faster switching between services and zapping content. The 'All zap' burst follows (or precedes) all or some of the elementary streams. The burst transmission sequence may be, e.g., A-'All zap'-B-'All zap'-C-'All zap'-ESG-'All zap'-A-etc. FIG. 13 illustrates time sliced zapping content transmission in separate zapping bursts.

In this method the source streams 1, 2, and 3 are from time sliced channel A. The time-sliced channels B and C may include one or more corresponding source streams from which the data for the zapping stream is taken directly or modified indirectly. Advantages of this method include that zapping content modifications are possible at the transmitter side, and power consumption in zapping mode is low. However, extra capacity is required from the air interface.

Figure 14:
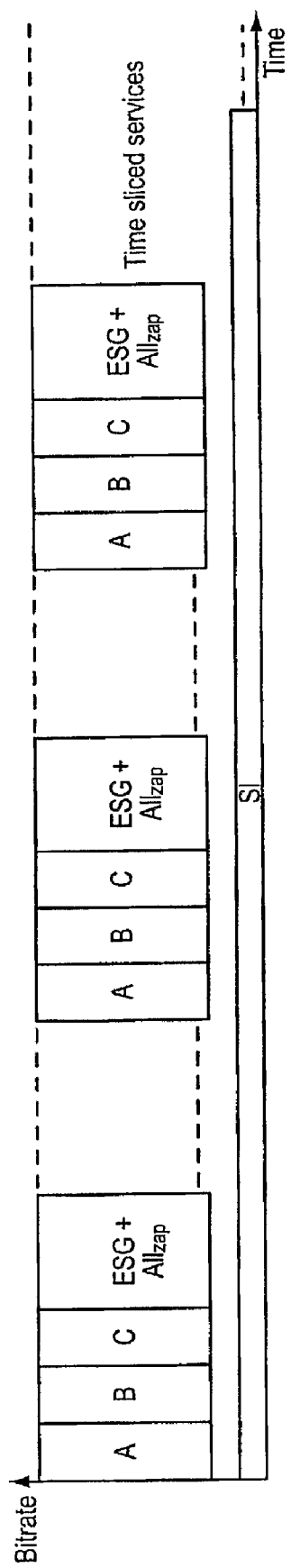
FIG. 14 illustrates data in a time slice sequence according to an illustrative aspect of the invention.

A third possible method includes zapping information from all services in ESG bursts. That is, an alternative to providing combined time sliced zapping+ESG stream is to have one or more dedicated time sliced elementary stream(s) for the combined zapping and ESG information, illustrated in FIG. 14. FIG. 14 illustrates time sliced zapping content transmission combined with ESG bursts. ESG and zapping information is preferably separated from each other at layer 2 or above. Alternatives for zapping and ESG content separation include:
  use of real-time parameters by defining dedicated real-time parameter for this usage;
  use of different MAC addresses for zapping and ESG;
  use of different IP addresses, e.g., by defining a zapping source or destination address; and
  separating zapping and ESG content in the application layer.

Advantages of this method include, in zapping mode, ESG data can also be received easily, and zapping can be performed via the ESG. Also, zapping content modifications are possible at the transmitter side, and power consumption in zapping mode is favorable. However, extra capacity is required from the air interface.

The following three methods provide for the transmission of zapping content without copying the content. Because the actual content is not copied to a zapping stream but only signaled, these methods do not require extra capacity from the air interface. Because content is not copied, there is presently no possibility to modify the zapping stream.

Figure 15:
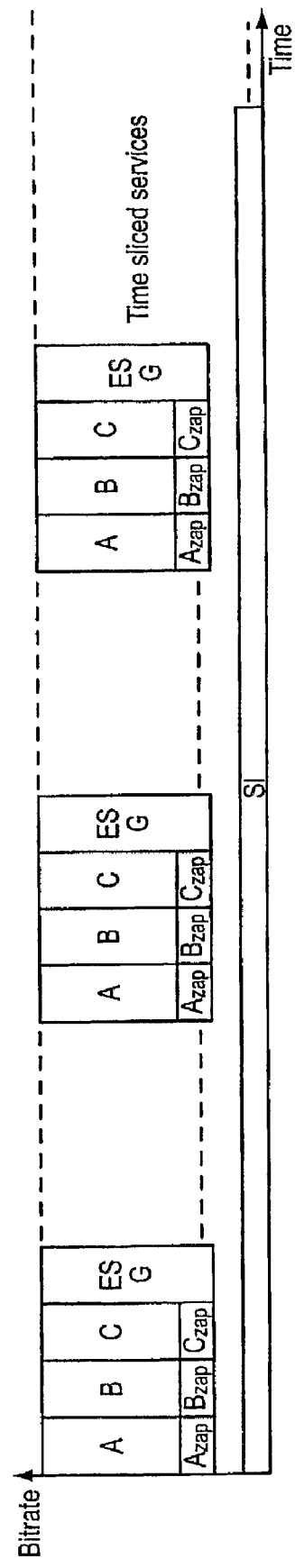
FIG. 15 illustrates data in a time slice sequence according to an illustrative aspect of the invention.

Thus, a fourth method may send zapping information in separate bursts during original bursts, also referred to as bit-rate interleaving. FIG. 15 illustrates time sliced zapping content transmission, where zapping bursts are sent in parallel with real services. As illustrated in FIG. 15, Zapping frames are separated into different PIDs as in the second method, above, but all zapping content is not combined into combined bursts. Instead, small zapping bursts containing content from one service burst are provided. An alternative to providing separate time sliced zapping streams is to have one or more dedicated time sliced elementary stream(s) for zapping information. Elementary streams may be logically separated from each other using the PID.

Figure 16:
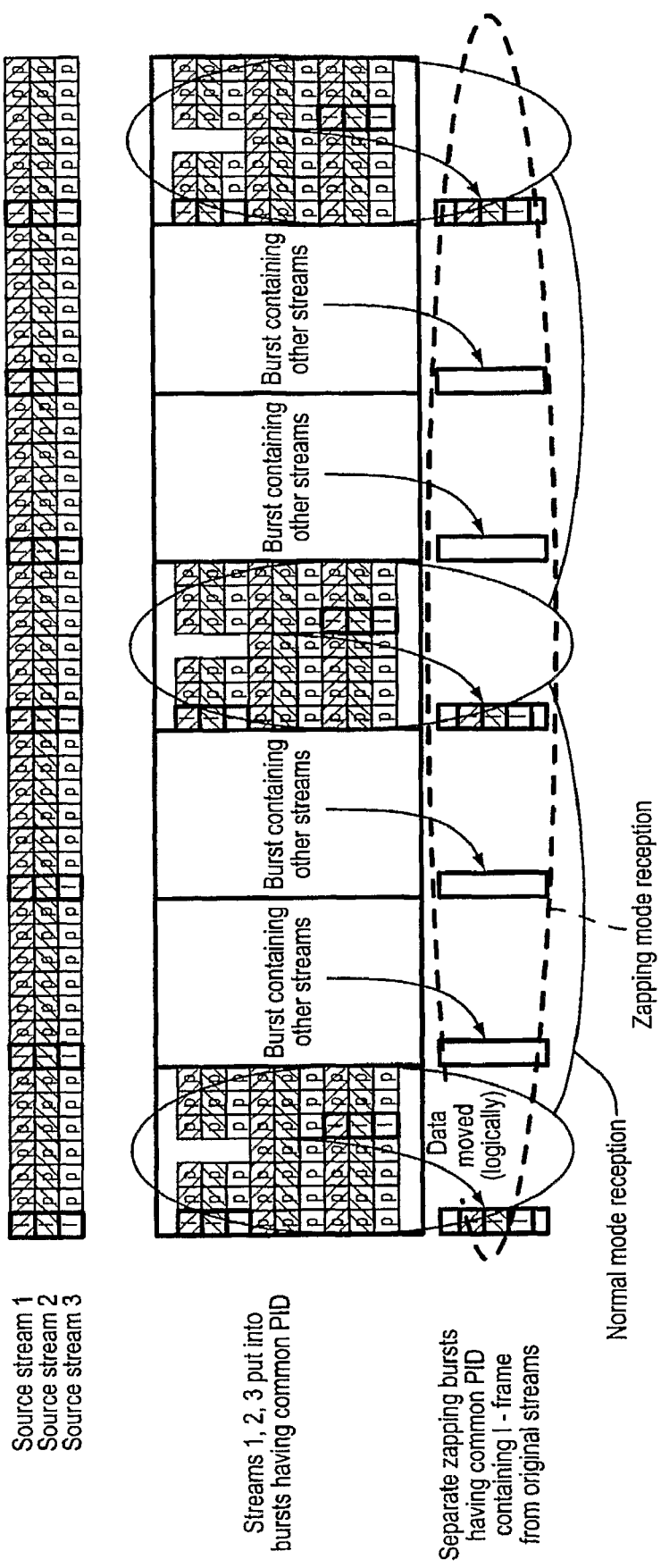
FIG. 16 illustrates a composition of stream data in time slice bursts according to an illustrative aspect of the invention.

While in a normal mode, receivers receive the time sliced channel A (including, for example, programs 1, 2, 3, 4)+"zapping" time slice channel Azap (including zapping frames for programs 1, 2, 3, 4). In a zapping mode, the receiver may receive all zapping channels Az . . . Nz, including zapping frames from all programs. Receivers are preferably capable of receiving all the zapping program in zapping mode. FIG. 16 illustrates normal mode reception and zapping mode reception principles.

Advantages of this fourth method include that no extra capacity is required from the air interface as content for zapping is only logically separated from original content, and MPE-FEC interleaving depth is the same as original burst interleaving depth. However, receiver filtering and buffering becomes more complicated as both "real" and "zapping" time slice channels need to be received. In addition, in zapping mode, the receiver needs to be "on" all the time, and zapping content modifications are not possible at the transmitter side as zapping content is also content for actual service.

A fifth possible method sends zapping information right after original bursts, as illustrated in FIG. 17. FIG. 17 illustrates time sliced zapping content transmission where zapping bursts are sent in-between real services. This method is similar to the fourth method, above, but original bursts and zapping bursts are time interleaved, as illustrated in FIG. 17. The zapping bursts can alternatively be sent before the original bursts. An advantage of this fifth method includes that no extra capacity is required from the air interface as content for zapping is only logically separated from original content. However, receiver filtering and buffering becomes more complicated as both "real" and "zapping" time slice channels need to be received. Also, in zapping mode, the receiver needs to be on all the time, and zapping content modifications are not possible at the transmitter side. Furthermore, zapping content interleaving depth is decreased as compared to Method 4.

A sixth possible method provides separate zapping information after burst reception, as illustrated in FIG. 18. FIG. 18 illustrates time sliced zapping content transmission where zapping is included in real service bursts. In this method, only information regarding how zapping content can be found from actual bursts is transmitted. Alternatives for zapping and real service content separation are (same list as for third method, above):

use of real-time parameters by defining dedicated real-time parameter for this usage;
use of different MAC addresses for zapping and ESG;
use of different IP addresses, e.g., by defining a zapping source or destination address; and
separating zapping and ESG content in the application layer.

Advantages of this sixth method include that no extra capacity is required from the air interface, as content for zapping is only logically separated from original content. However, receiver filtering and buffering becomes more complicated as both "real" and "zapping" information needs to be received and, in zapper mode, the receiver needs to be "on" all the time. In addition, zapping content modifications are not possible at the transmitter side, and MPE-FEC decoding cannot be applied in receivers unless the whole burst is received.

Each zapping stream may contain data from one or more, or all, elementary streams. For example, the timesliced zapping stream 'All zap' of the second method, above, may contain zapping data from only two of the three source streams of A, zapping data from all source streams of B and zapping data from only one source stream of C (even if C includes more than one source stream). Although in the examples, e.g., Azap is disclosed to include zapping data from A, according to the spirit of the invention the Azap data may contain zapping data from other elementary streams (e.g., B and/or C) as well. More frequent zapping burst transmission may be performed by using bit-rate interleaving (Bzap and/or Czap or parts of them may be sent in the same burst as A and Azap, as in FIG. 15).

Because no or very few changes are preferably made in the receiver (in any layer of the receiver protocol stack), the same audio and video coding and transport formats are preferably used as for ordinary programs. However, content from different sources are preferably multiplexed into the same program. The following four solutions may therefore be used to permit multiplexing of content from different sources into the same program.

A first solution multiplexes several IP streams from different source IP addresses to the same program. The IP encapsulator associates several source IP addresses to one program, i.e., the IP encapsulator composes a time-slice burst from several IP streams. The receiver is aware of and handles several IP streams in a program. The same source IP address can be used in the zapping program as for the actual programs, which provides mapping from the content in the zapping program to the actual programs. As each stream with a unique source IP address within the zapping program is independent from the other streams in the zapping program, the following should be noted. First, to enable a live program guide, the (instantaneous) decoding complexity of the zapping program is preferably such that it does not exceed the decoding complexity of the terminal (or a particular terminal class). For example, coded video pictures having the same decoding time may cause a considerable peak in decoding complexity. Second, to enable the live program guide without requiring many simultaneous video decoder instances in the receiver, the video content is preferably such that no inter prediction (a.k.a. motion compensation) is used. Otherwise, the contents of the decoded picture buffer, a.k.a. the reference picture buffer, would differ in the receiver compared to the encoders that created the content. Third, the sequence and picture parameter set are transmitted within each access unit of H.264/AVC.

A second solution is to multiplex several IP streams into the same IP stream, each origin IP stream having a separate value of the SSRC field of the RTP header. See section 5.2 of RFC 3550, herein incorporated by reference.

A third solution is to generate one video bitstream from multiple source video bitstreams (in the IP encapsulator). One coded picture in an original bitstream is copied as such to the output video bitstream of the IP encapsulator. This provides a benefit compared to the previous two solutions in that receivers need not synchronize multiple clock sources simultaneously (but rather the IP encapsulator does it). In addition to the issues above, care should be taken that each coded video picture can be mapped to the right actual program. This mapping information can be carried in the CSRC field of the RTP header (provided that the number of programs is less than or equal to 15).

A fourth solution is to generate one video bitstream from multiple source video bitstreams (in the IP encapsulator). The generated video bitstream is such that its decoding results in the tiled view of actual programs. One disadvantage to this approach is that it becomes harder to design other types of user interfaces than the tiled view in the real-time program guide of the receiver. However, a significant advantage is that minimal changes in the receiver are required, i.e., the receiver may operate exactly the same way as when receiving a normal program.

In this fourth solution, to avoid re-encoding, the source coded pictures should not predict from samples outside picture boundaries. When only intra-coded pictures are used, this is not an issue. Also to avoid re-encoding, the full Baseline Profile of H.264/AVC must be supported in receivers. The full Baseline Profile includes the so-called Flexible Macroblock Ordering technique, which enables forming slice groups, each slice group containing macroblocks from a single source. The picture size of the source coded pictures preferably are such that the tiled picture can be built without re-encoding. Each "tile" can be mapped to its corresponding program, e.g., using a pre-defined tile-to-program association or including the association information as a Supplemental Enhancement Information (SEI) message into the video bitstream. The independent slice group set SEI message can be used to instruct the receiver that it can decode only the desired part (slice groups) of the received coded pictures.

Content for zapping programs may originate from at least two alternative sources. First, the same source encoder that creates the actual program may also create the content for the zapping program. This allows that the source encoder may have access to the semantics of the program to select key frames in an intelligent manner. However, the same program may be multiplexed in different MPEG-2 TS multiplexes, each having different requirements regarding bitrate and picture size for the content of the zapping program, or at the time of encoding, the source encoder may not know the requirements of the content for the zapping program.

Second, the IP encapsulator may create the zapping program from the actual programs. This allows that source encoders need not encode and transmit multiple streams per one content type at the same time, and the encapsulator may make use of leftover capacity for zapping streams. However, computational requirements for the IP encapsulator are increased. In addition, to avoid re-encoding of the content, source encoders need to create the bitstreams in a specific way. In particular, picture size should be appropriate to the zapping program. It is also preferable that coded pictures to be included in the zapping program are indicated with a Supplemental Enhancement Information (SEI) message, for example, and that the bitrate and frame rate of these coded pictures are appropriate to the zapping program.

Video buffering in the receiver also may be performed. Video buffering in the receiver may include transmission delay jitter buffering, de-interleaving buffering, pre-decoder buffering, and post-decoder buffering. Transmission delay jitter buffering is used to smooth out variations in transmission end-to-end delay. De-interleaving buffering is used to arrange packets from their transmission (and reception) order to their decoding order. The publicly known document draft-ietf-avt-rtp-h264-11.txt provides more details on the interleaved packetization mode and process for de-interleaving buffering. Pre-decoder buffering (a.k.a. coded picture buffering) is used to guarantee that the video bitrate is such that decoding in real-time is possible (i.e., to avoid "evil" bitstreams with very large coded pictures that are supposed to be decoded in real time). Post-decoder buffering (a.k.a. decoded picture buffering) is used to organize decoded pictures from their decoding order to output order. In addition, the capability of producing correct output pictures affects the delay that the end-user perceives. The working assumption in 3GPP PSS Rel-6 (i.e., unicast streaming) is that clients must support open GOPs and gradual decoding refresh.

There are several issues that arise when considering the delay aspects of H.264/AVC in DVB-H IPDC context, and these include transmission delay jitter, de-interleaving buffering, coded picture buffering, post-decoder buffering, and frequency of random access points.

With respect to transmission delay jitter, various delays may be taken into account. Regarding the delay occurring between the server and IP encapsulator, because there is no guarantee of whether the connection has QoS-reservation capability or is over-provisioned, an aspect of the invention is to account for a worst-case delay jitter such as is typical in Internet transmissions. The delay jitter buffering may be placed in the IP encapsulator or in the receiver. DVB specifications preferably recommend which one of the above is the case. In one embodiment the delay jitter buffering is in the IP encapsulator, as it may have a mechanism or means to conclude how much delay jitter is expected, e.g., based on RTP/RTCP inter-arrival jitter calculations and similar methods.

The delay due to time-slicing results in considerable delay jitter is discussed further below. The delay occurring between the IP encapsulator and the receiver can be assumed to be constant.

With respect to de-interleaving buffering, the H.264/AVC RTP payload format allows sending data out of its decoding order. Potential use cases in DVB-H IPDC include fallback to a slide show mode in case of failed error correction by interleaving redundant coded pictures "far" from corresponding primary coded pictures, improved error concealment, and decreased RTP/UDP/IP packetization overhead. 3GPP PSS specifies a requirement on the receiver de-interleaving buffer size which corresponds to roughly 2.5 seconds of data with the maximum bit rate of the video coding level in use. However, practical deinterleaving delays for multi and broadcast are likely to be less than 0.5 seconds.

With respect to coded picture buffering due to non-constant video bit rate, it should initially be noted that coded video is inherently variable bit rate, and that the coded picture buffer size in H.264/AVC corresponds to about 2.5 seconds of data in maximum bit rate of a specified level (in "low" H.264/AVC levels). A typical value of initial buffering delay may be around 0.5 seconds. There are at least two alternatives to video handling and buffering in IPDC.

A first alternative for video handling and buffering in IPDC is to select burst size and interval according to the average bit rate of video. The sender sends data according to this average bit rate. There may be fluctuations in the bit rate the IP encapsulator receives, because, e.g., a) transmission delay jitter and packet losses, b) unpredictable transmission scheduling in server, and/or c) live encoding which does not result into constant bit rate. In case the average bit rate is exceeded, the IP encapsulator may store the "exceeding portion" to be included in the next burst. In order to ensure that the server does not overflow the IP encapsulator buffer, a buffering model similar to 3GPP PSS (TS 26.234) Annex G may be considered and/or there may be rate adaptation signaling between the IP encapsulator and the server. This may be applicable if there are only a limited number of IP encapsulators receiving the same multicast. When the average bit rate is not met, the IP encapsulator may stuff the rest of the burst. In the client, data may be moved from the receiving buffer to the coded picture buffer (or virtually moved, i.e., read directly from the receiving buffer) preferably at constant bitrate or at such a bit rate that is assumed in the video HRD/VBV model (Hypothetical Reference Decoder (HRD) in H.26× and the Video Buffering Verifier (VBV) in MPEG). The decoder follows the initial buffering information given in the bitstream before starting decoding and output.

This provides simple IP encapsulator operation, with a danger of buffer overflows (packet losses) in the IP encapsulator. Fixing this danger requires more complicated server implementation or sufficient overprovisioning of buffer allocation in the IP encapsulator. Also, live streams require initial buffering either in the encoder, the server, or the IP encapsulator—or may result in unused capacity in the air.

A second alternative for video handling and buffering in IPDC is to ensure that each burst contains a constant duration (in terms of playback time) of video. Burst size (in bytes) varies according to video bit rate over that period of time. Each sender (multicast server) sends video in variable bit rate (i.e., according to RTP timestamps). The IP encapsulator then puts a pre-defined amount (in terms of RTP timestamp difference) of packets in the same burst. While this is straightforward from the client point of view, servers do not generally operate in this manner. The IP encapsulator becomes more complex, and RTP timestamps are not sufficient if there is any reordering (either transmission reordering or output reordering) in the stream.

With respect to post-decoder buffering, at least two types of decoder conformance can be required from H.264/AVC decoders: output order conformance, and output timing conformance (in which the second is a superset of the first). An output order conformant decoder outputs decoded pictures in the correct order but does not necessarily output the pictures strictly at their output timestamps. An output timing conformance decoder outputs pictures in correct order and strictly at their output timestamps. In 3GPP many decoders are software based and operate on multi-process operating systems and therefore strict output timing conformance is not feasible. Therefore the working assumption in 3GPP service is that only output order conformance is required.

The initial decoded picture buffer delay, conveyed optionally in the bit stream, is a requirement only for output timing conformant decoders. However, if the delay is available in the bit stream, any receivers in DVB-H IPDC preferably follow it. To limit the initial post-decoder buffering, the encoders may set the num_reorder_frames VUI parameter in sequence parameter sets and decoders may utilize it in the buffering process similar to what is described in Joint Video Team document JVT-F047 (Section 4), 'DPB Management' (Filename: JVT-F047.doc) which was presented at 6th Meeting of Joint Video Team (JVT) of ISO/IEC MPEG & ITU-T VCEG (ISO/IEC JTC1/SC29/WG11 and ITU-T SG16 Q.6) in Awaji, Island, JP, 5-13 Dec. 2002. It should be noted that the maximum number of pictures that can reside in the decoded picture buffer may be, e.g., 16 or 15. If the picture rate is steady, e.g., 15 fps, this means that there can be up to 1 second of delay due to reordering from decoding order to output order. It should also be noted that reordering from decoding order to output order may be allowed because this allows (hierarchical) temporal scalability which yields improved compression efficiency, while achieving bit rate scalability, and this also allows intra picture postponement which yields improved error resiliency, while there is no penalty in compression efficiency. A practical amount of reorder may be in the magnitude of 5 pictures which results into 0.3 seconds in 15 fps video.

With respect to the frequency of random access points, there is a question (and trade-off) of service requirements (how frequent tuning-in is required), end-user expectations (how smooth channel zapping should be), error resiliency (how often should the picture be refreshed to stop any temporal error propagation), and compression efficiency (intra-coding is much less efficient than inter-coding). The compression ratio of an intra picture compared to an inter picture with same quality is roughly 5:1 (depending on picture contents), i.e., the intra picture is 5 times larger than the inter picture. Thus, if intra frame frequency is once per 5 second instead of once per second, more than 15% savings in bit rate are expected.

Whenever there is a scene cut in a video program, it is preferable to code an intra picture. Scene cut frequency depends on the type of content and varies from less than half a second (e.g., movie trailers) to non-existing (e.g., web cams). Altogether, an expected "application" delay may be as follows:

Transmission delay jitter buffering (in IP encapsulator): no delay for the receiver/end-user.
De-interleaving buffering: from 0 to 0.5 seconds.
Pre-decoder buffering (a.k.a. coded picture buffering): from 0 to 0.5 seconds.
Post-decoder buffering (a.k.a. decoded picture buffering): from 0 to 0.3 seconds.
Intra picture frequency, e.g., once per two seconds. Thus, a delay from 0 to 2 seconds.

Summing up the above results in a maximum delay from 0 to 3.3 seconds. Further assuming no interleaving and no output reordering and flat probability distribution results in an average "application" tuning-in delay of 1 to 1.5 seconds.

Figure 19:
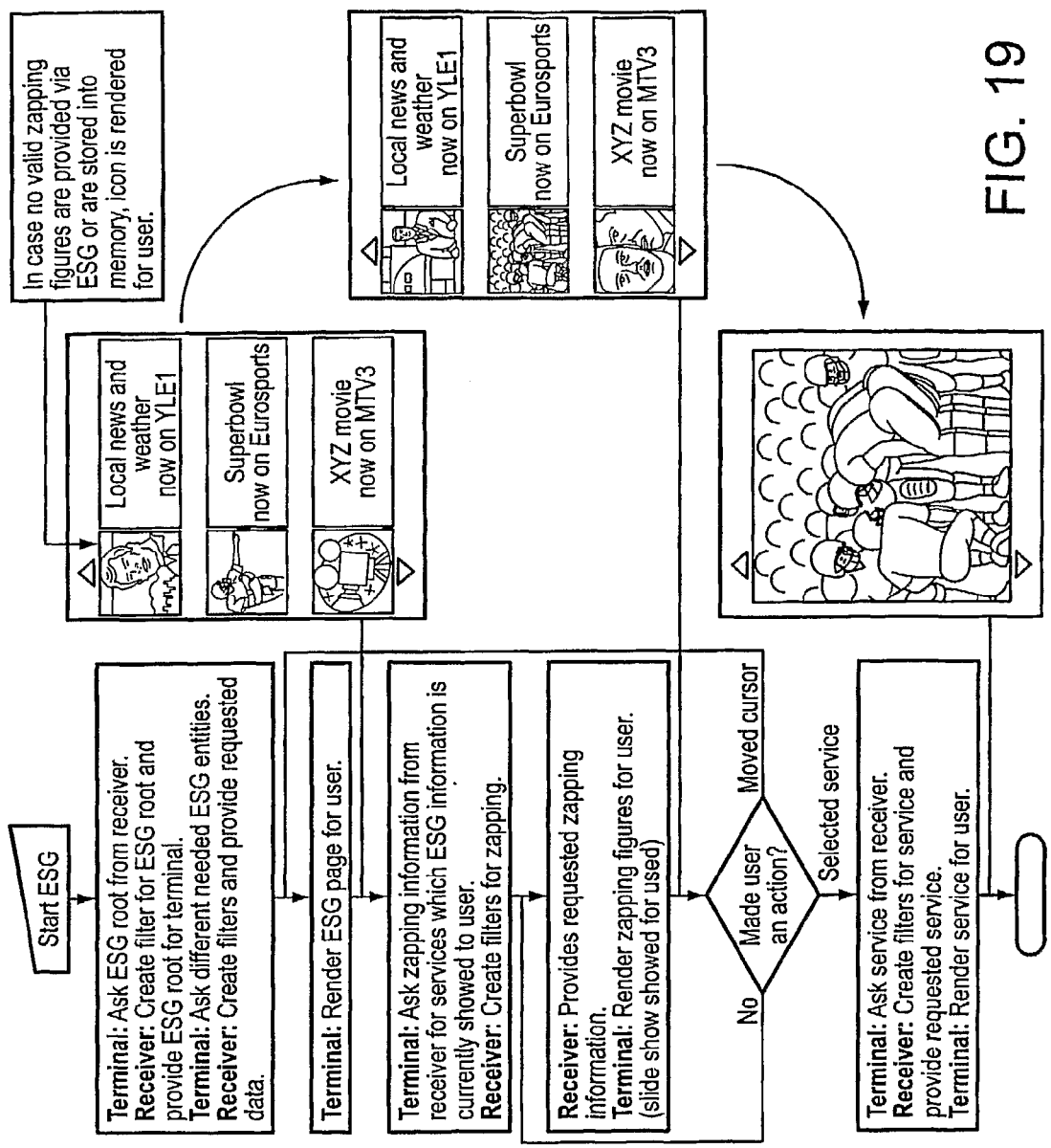
FIG. 19 illustrates a method and data flow for providing zapping information in a mobile terminal.
Figure 20A:
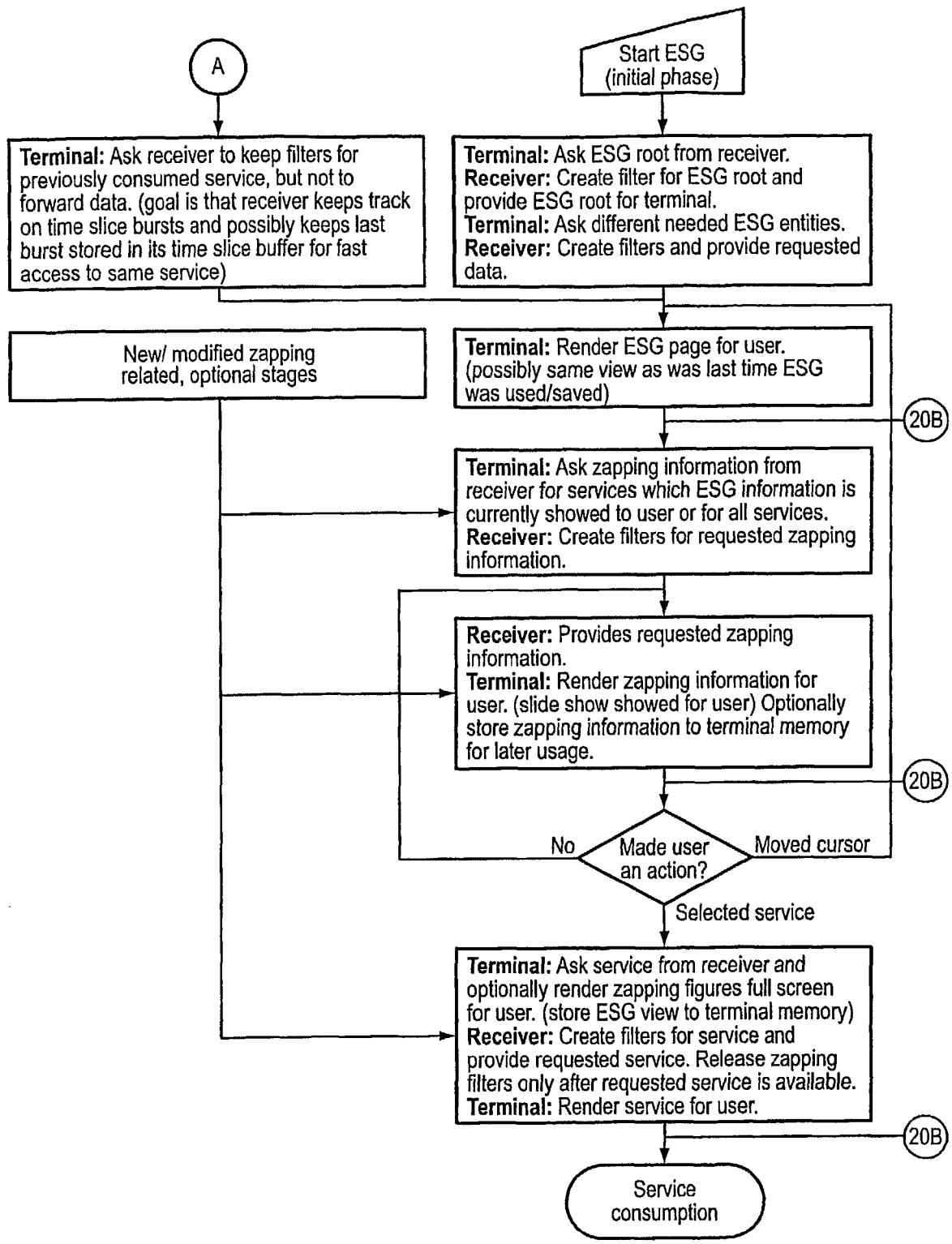
FIG. 20 illustrates a method and data flow for providing zapping information in a mobile terminal.
Figure 20B:
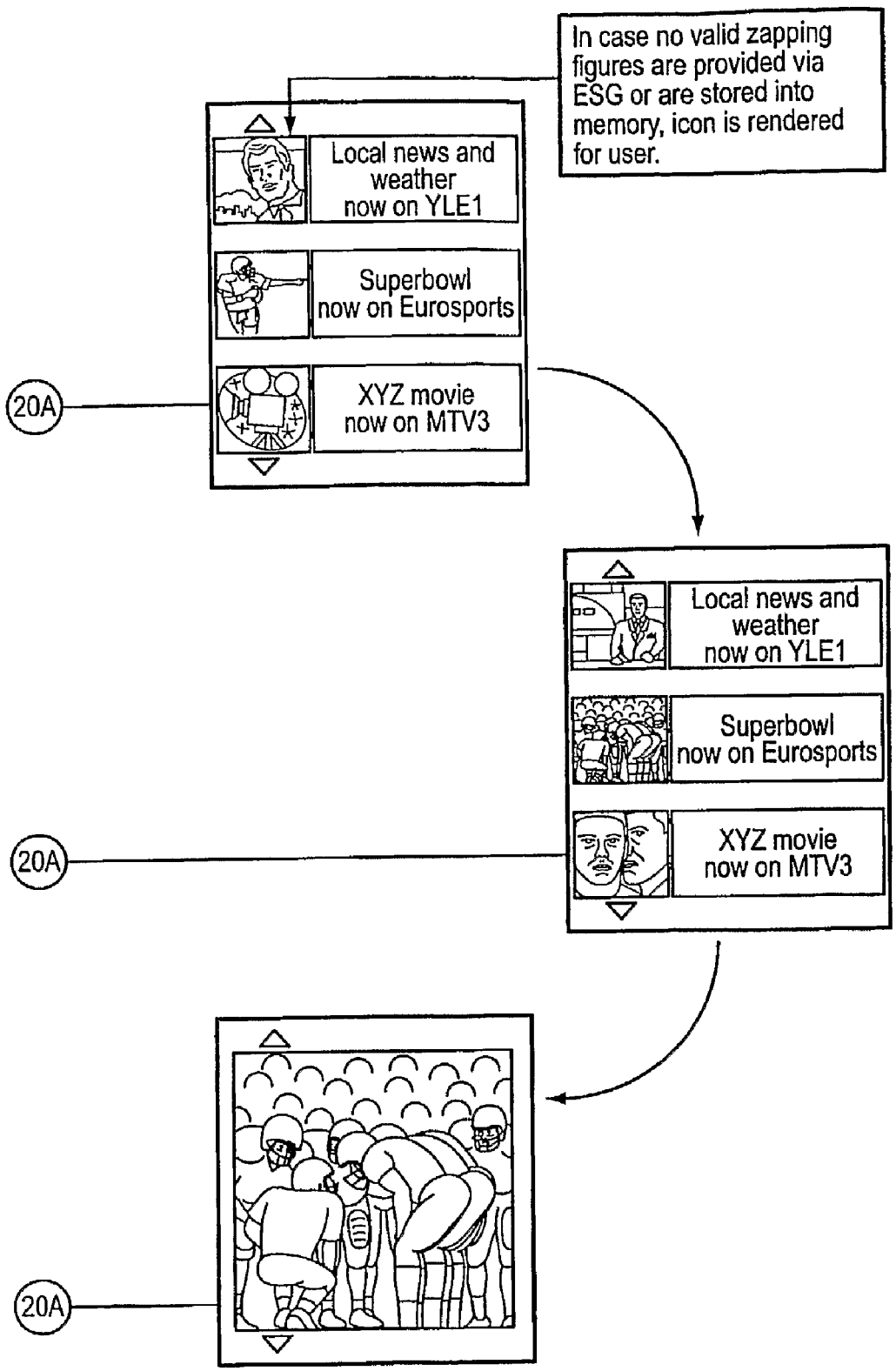
Figure 21:
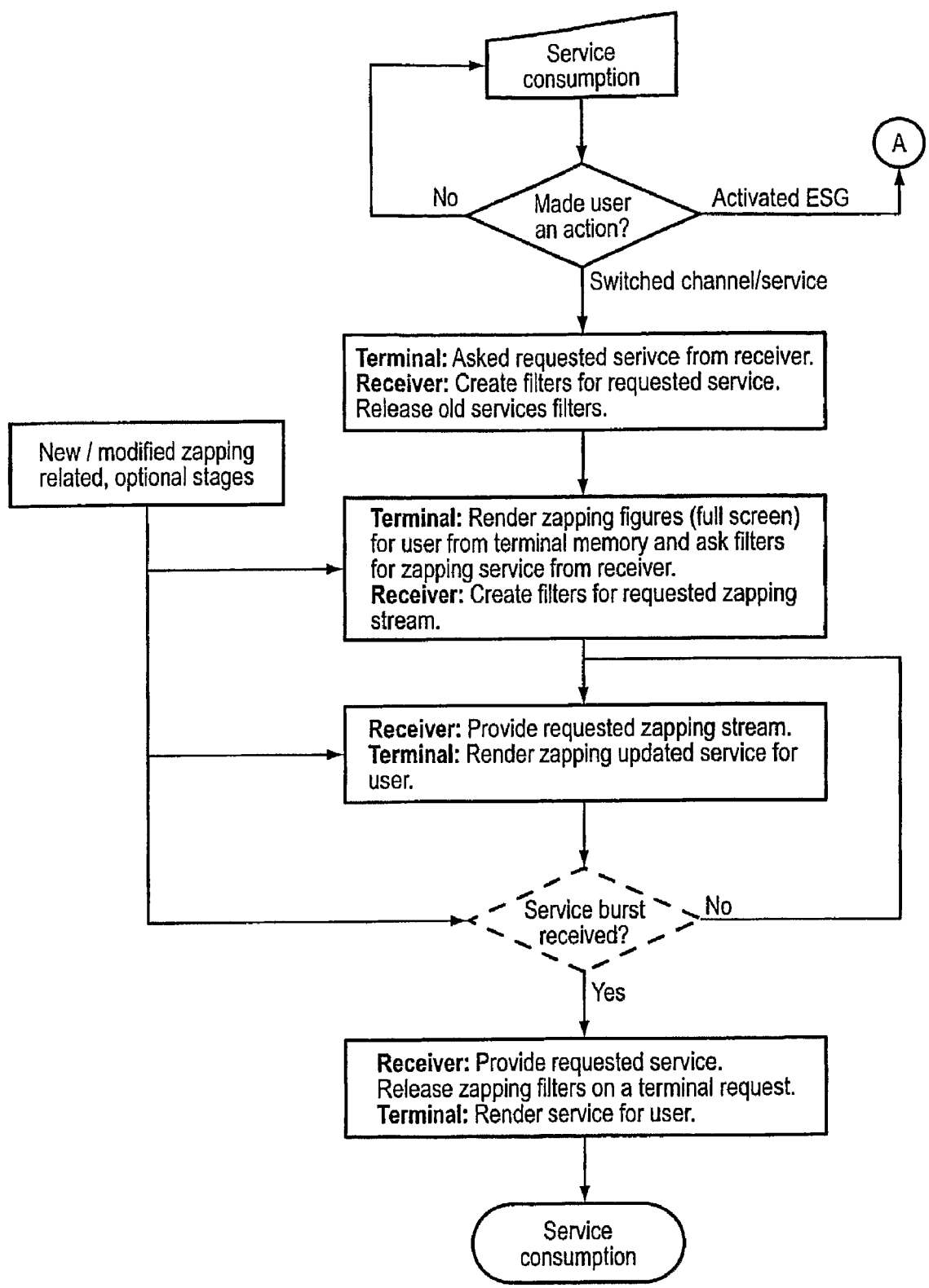
FIG. 21 illustrates a method for providing zapping information in a mobile terminal.
Figure 22:
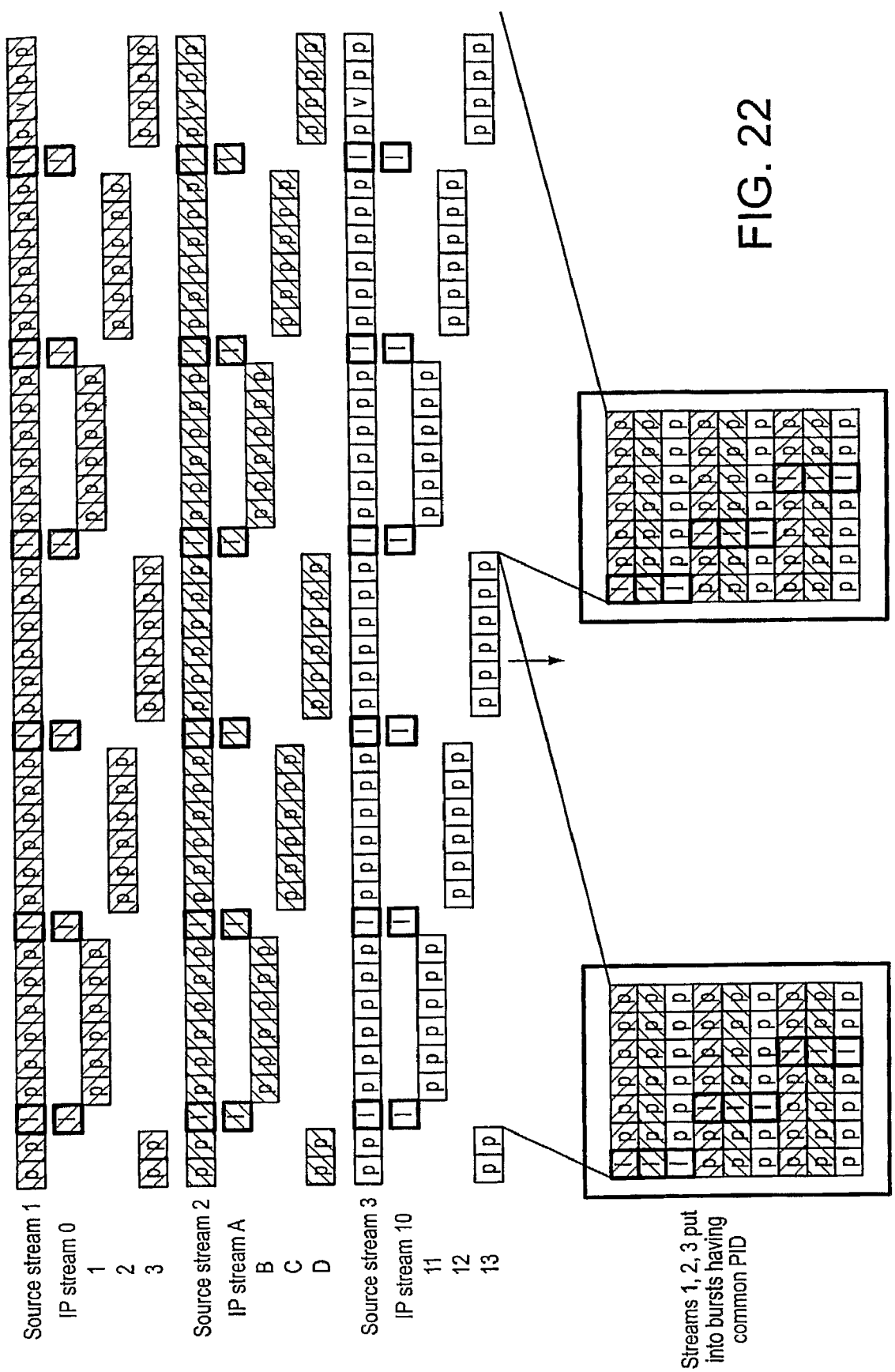
FIG. 22 illustrates a composition of stream data in time slice bursts according to an illustrative aspect of the invention.

FIG. 19 illustrates a method for providing zapping data to a user/terminal, including sample screenshots during the process. FIG. 20 illustrates an alternative method for providing zapping data to a user/terminal, including sample screenshots during the process. FIG. 21 illustrates yet another method for providing zapping data to a user/terminal. FIG. 22 illustrates synchronization of several IP streams into a burst. The first source stream 1 is delivered in four IP streams: IP stream 0, IP stream 1, IP stream 2, and IP stream 3. The other source streams, respectively, in IP streams A, B, C and D and IP streams 10, 11, 12, and 13. The frames of these streams are put into the burst starting from the upper left corner as follows: I-frame from IP stream 0, I-frame from IP stream A, I-frame from IP stream 10, then in the corresponding order the p-frames from IP streams 1, B and 11, etc.

Video random access and identification of I pictures from coded bitstream will now be described. There are at least three ways to access the H.264/AVC stream randomly. First, An IDR (Instantaneous Decoder Refresh) picture is coded such that it provides a "clean" decoder reset. In other words, all decoders can start decoding from an IDR picture provided that necessary sequence and picture parameter sets are received prior to or within the same IDR access unit. In practice, an IDR picture is an intra-coded picture causing all decoder buffers to flush.

Figure 23:
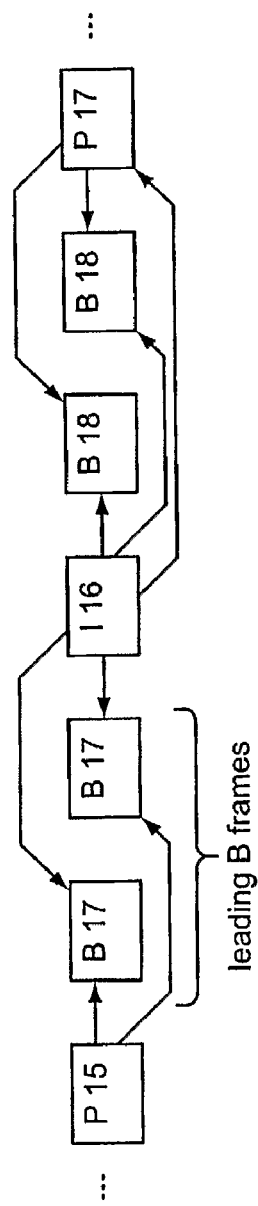
FIG. 23 illustrates a MPEG-2 GOP structure according to an illustrative aspect of the invention.

Second, with reference to FIG. 23, an intra-coded picture that is not an IDR picture can be used for random access provided that no reference picture following the intra picture in decoding order refers (in its inter prediction process) to a reference picture prior to the intra picture in decoding order. This is known as an "open GOP" in MPEG-2 terms. An H.264/AVC decoder can recognize an intra picture starting an open GOP from the recovery point SEI message in the H.264/AVC bitstream. Insertion or parsing of recovery point SEI messages is not required in H.264/AVC standard, though, and if this feature is desirable in DVB-H IPDC, it should be specified in DVB specifications. The benefit over IDR pictures is increased compression efficiency which becomes remarkable when the random access point frequency is relatively high (e.g. once every half a second). FIG. 23 illustrates a MPEG-2 GOP structure (... PBBIBBP...). The "leading" B pictures follow the intra picture in decoding (bitstream) order, because the intra picture is one of their reference pictures. "Leading" B pictures cannot be decoded after accessing the intra picture randomly, because at least one of their reference pictures is not available. If decoding of "leading" B pictures is not done, the intra picture can be used as a random access and recovery point. A GOP may be closed (difference frames are based only on I-frames within the GOP) or open (the first difference frame in the GOP is based on an I-frame in the previous GOP; this is referred to as a leading B-frame).

Figure 24:
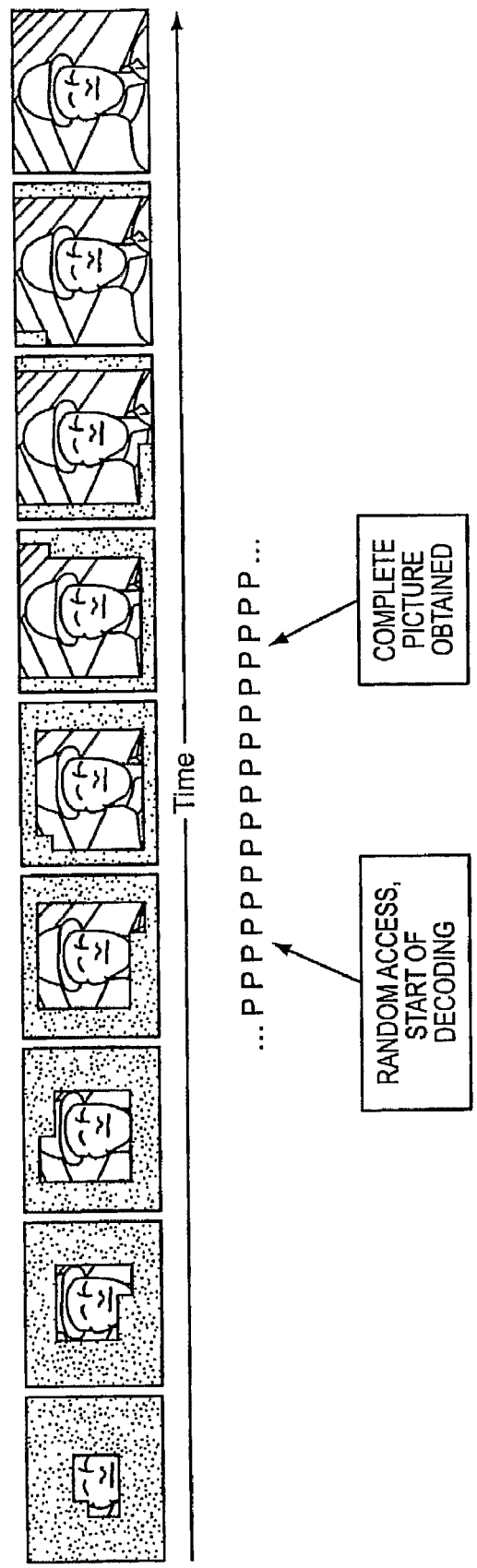
FIG. 24 illustrates gradual decoding refresh according to an illustrative aspect of the invention.

Third, with reference to FIG. 24, gradual decoding refresh may be used. A picture is refreshed by including intra macroblocks in consecutive inter-coded pictures. This type of picture refresh can be indicated with the recovery point SEI message as well. For example, a random access point can be indicated by the location of the recovery point SEI message within the bitstream. The recovery point may be indicated by a picture count in the recovery point SEI message. All pictures at and subsequent to the recovery point are correct in content. This avoids bit-rate fluctuations caused by "random access I pictures", and provides intra macroblock refresh for error resiliency. Circular intra macroblock refresh combined with adaptive intra macroblock refresh has been shown to be an effective approach in error-prone video transmission. There is also improved error resilience.

Regardless of which type of random access is used, sequence and picture parameter sets are preferably set prior to or in the access unit where decoding starts. There are at least two ways to transmit sequence and picture parameter sets. The first is within the SDP description of the stream. This requires that the parameter sets stay unchanged during the lifetime of the "session." Insertion of spliced content (commercials) might be problematic, as spliced content may originate from a different encoder as the "main" stream but should either use the same contents of parameter sets or have unique parameter set identifiers. The second way is within the bitstream. Parameter sets are added in each random access point to enable tuning in. To achieve error robustness, parameter sets are preferably repeated at least a couple of times or more.

In receivers and systems where accurate timing is essential (to avoid buffer underflows and overflows in client side), each random access point is associated with information specifying how much to buffer initially before starting the decoding. This piece of information is typically carried within the video bitstream. In H.264/AVC, this is carried in the buffering period SEI message. The initial buffering delay in a DVB-H IPDC system differs from conventional systems, though, due to time-slicing.

There are at least two ways to access "conventional" (MPEG-2, H.263, etc.) video streams randomly: 1) decoding is started from an intra picture; and 2) gradual decoding refresh. In conventional coding standards, each intra picture serves as a random access point, as there are no multiple reference pictures for inter prediction. There is no standardized signaling for gradual decoding refresh, but this can be used in digital TV systems.

Similar to H.264/AVC, some standards (e.g. MPEG-2) require reception of sequence headers prior to random access. In conventional standards, the picture header is always present in each coded picture (and therefore no special encoding or transport considerations are needed as with H.264/AVC picture parameter sets). In conventional video coding standards, random access points in the bitstream typically contain information on initial buffering.

Regarding the issue of identifying I pictures in the IP encapsulator to redirect them to the "zapping stream," in the H.264/AVC codec layer (i.e., when information in RTP payloads is utilized), the following constraints on encoding and RTP packetization to allow straightforward IP encapsulator operation may be used:

The encoder creates an access unit delimiter NAL (network abstraction layer) unit for each intra or IDR picture the encoder wants to include in the zapping stream. (For other pictures, an access unit delimiter may or may not be created.);

The RTP packetizer (in the server) either uses the non-interleaved packetization mode or transmits the access unit delimiter prior to any other NAL units of the corresponding IDR or intra picture;

If the non-interleaved packetization mode is in use, the IP encapsulator checks if the first NAL unit in the payload is an access unit delimiter and if it indicates an intra or IDR picture. This requires a bit mask operation of the two first bytes in the RTP payload. If yes, then the IP encapsulator redirects or copies all packets with the same RTP timestamp to the zapping stream; and If the interleaved packetization mode is in use, the IP encapsulator deaggregates RTP payloads, but otherwise the operation is the same as the non-interleaved case.

Without the requirement to insert an access unit delimiter NAL unit to the bitstream, it becomes difficult for the IP encapsulator to identify all NAL units belonging to intra and IDR access units. In conventional video codecs, intra pictures can be identified from the corresponding bits in the picture header. The IP encapsulator needs to identify a picture header (from RTP payload header or from a picture header synchronization codeword in the bitstream, which is typically in the beginning of the RTP payload), and parse the picture coding type of the picture header. This is a bitmask operation with some conditional branches.

Figure 25:
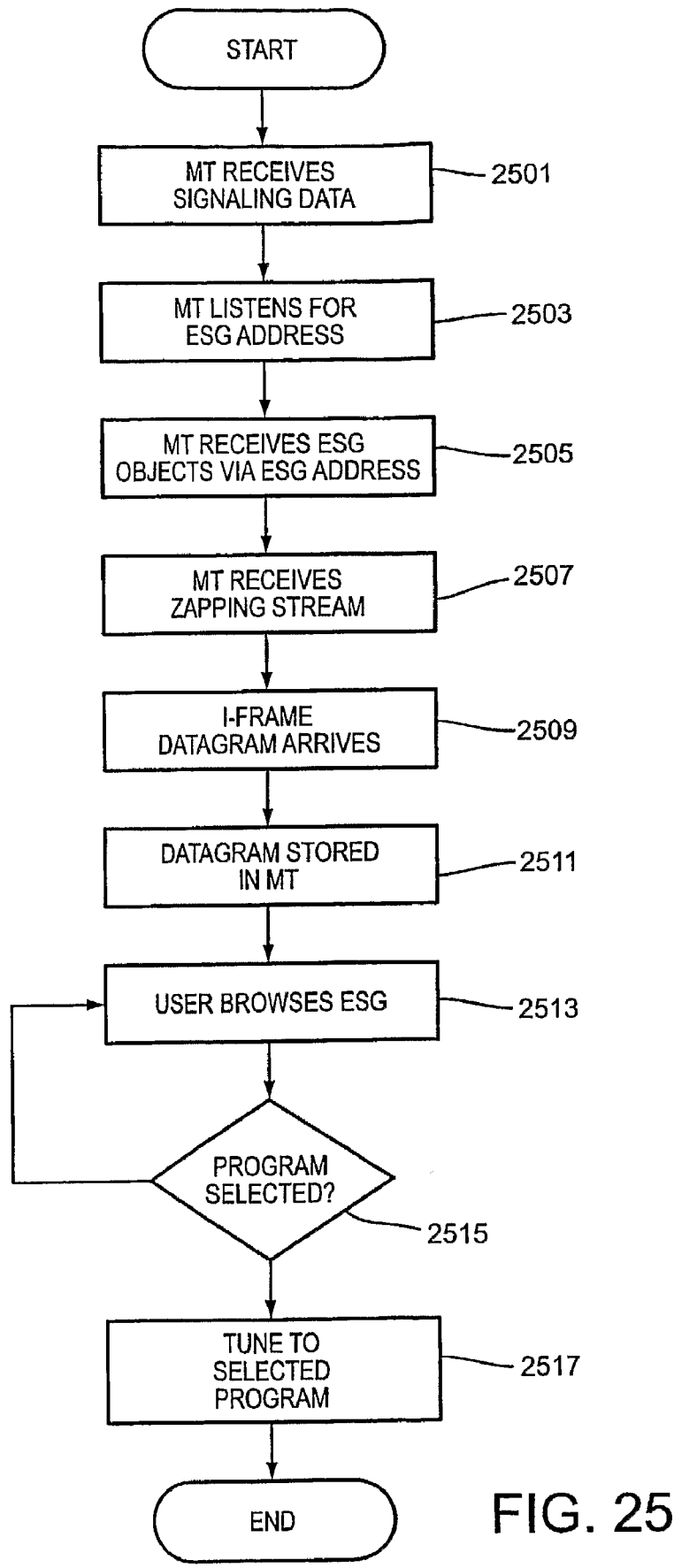
FIG. 25 illustrates a method for providing zapping data according to an illustrative aspect of the invention.
Figure 26:
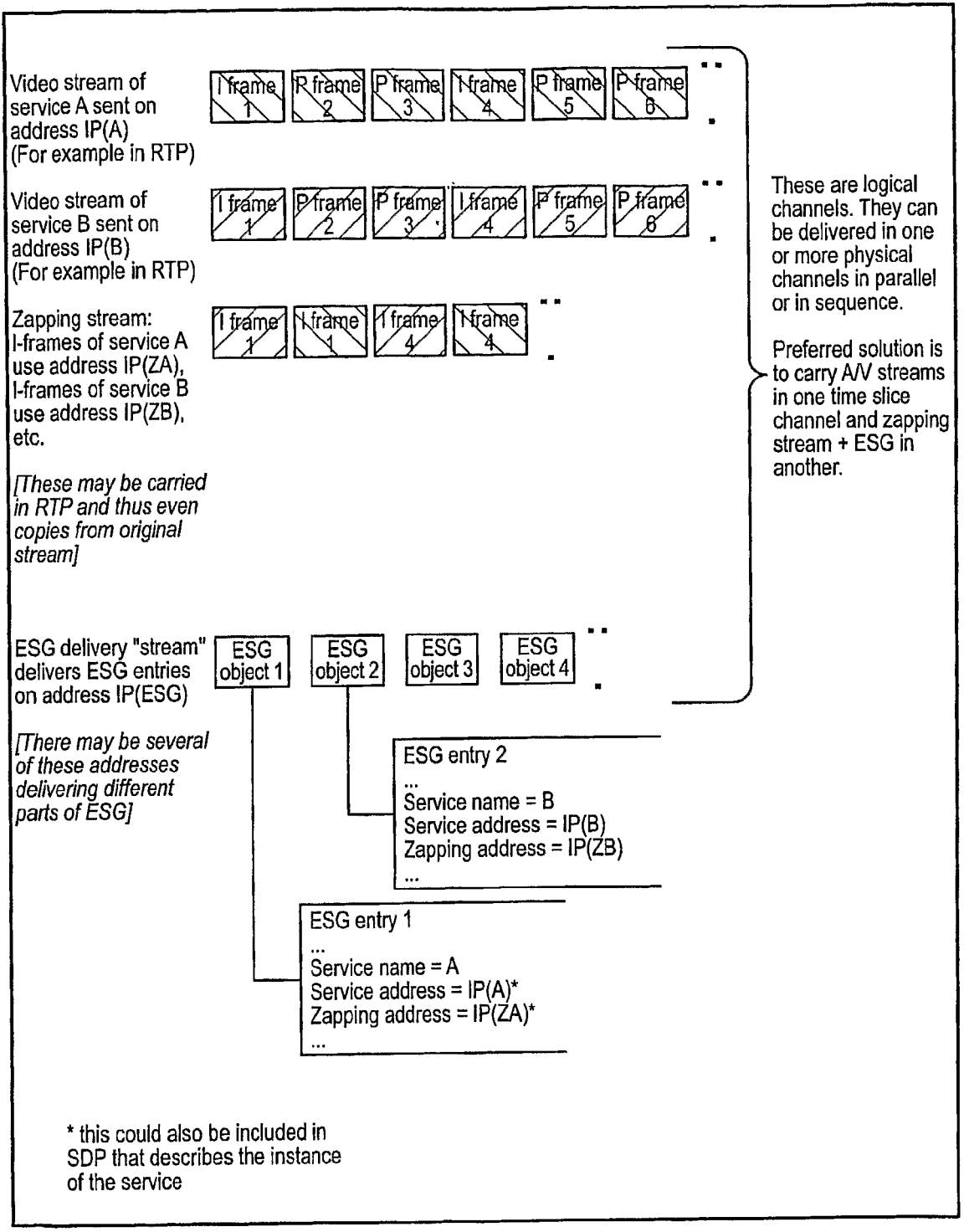
FIG. 26 illustrates provisioning of zapping data according to an illustrative aspect of the invention.

An example of receiver operation in an illustrative DVB-H embodiment is described with respect to FIG. 25. FIG. 25 illustrates a method for presenting zapping data and tuning to a desired program. A mobile terminal (not shown) in step 2501 receives PSI/SI signaling that maps IP(A), IP(B), IP(ZA), IP(ZB) and IP(ESG) to DVB-H link parameters such as PID. The mobile terminal listens in step 2503 for an IP(ESG) address (which in turn causes DVB-H tuning, filter creating, etc.) and in step 2505 starts receiving ESG objects over address IP(ESG). For each received ESG entry the mobile terminal starts receiving a zapping stream in step 2507. That is, the mobile terminal starts listening for IP(ZA), IP(ZB). In step 2509 a datagram arrives at address IP(ZA), the datagram being an I-frame containing zapping image data for service A. The mobile terminal knows the datagram has an I-frame because the binding is available in ESG entry 1. The same applies for other addresses IP(ZB), IP(ZC), etc. In step 2511 the received datagram is stored in mobile terminal data storage associated with ESG entry. If there is already a datagram, it is simply overwritten. This way the zapping stream updates zapping pictures for all services for which the mobile terminal has entries. In step 2513, a user browses the ESG structure going through ESG entries that are stored in terminal data storage. Browsing quickly (zapping) the entries, the terminal quickly renders the stored zapping image related to the entry (received in 2509 and stored in 2511). If the user stops browsing for T seconds at a particular entry (step 2515), the mobile terminal in step 2517 automatically tunes to the selected service D, and starts buffering and playing back the data stream from address IP(D). While buffering and starting, the terminal renders the last zapping image that was received through IP(DZ). Additional details are readily discernible from FIG. 26.

The present invention includes any novel feature or combination of features disclosed herein either explicitly or any generalization thereof. Any of the method steps disclosed herein can be implemented in computer software, hardware, or combinations thereof, and may be embodied on computer-readable media. Functions for selecting, forming, transmitting, receiving, processing, and displaying can be carried out using one or more processors and/or other chipsets programmed to carry out the respective functions. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:
1. A method comprising:
selecting one or more data items from one or more programs to be included in zapping data, the selected one or more data items including content data;
forming from the selected one or more data items one or more data streams carrying the zapping data; and
causing, at least in part, actions that result in transmission of the one or more data streams carrying the zapping data as a series of time slice bursts having an idle time between transmission of at least two of the time slice bursts during which the one or more data streams are not transmitted.

2. The method according to claim 1, wherein the selected one or more data items comprise video data.

3. The method according to claim 2, wherein the selected video data comprises an intra-coded picture data.

4. The method according to claim 3, wherein the selected intra-coded picture data is synchronized to start of a time slice burst.

5. The method according to claim 4, wherein a flow label value for intra-coded picture data is configured for use in the synchronization.

6. The method according to claim 1, wherein at least one datagram from the one or more data streams carrying zapping data is included in a timeslice burst carrying program data.

7. The method according to claim 1, wherein the zapping data is one of a plurality of entries in an electronic service guide.

8. The method according to claim 1, wherein at least one datagram from the one or more data streams carrying zapping data is included in a timeslice burst carrying electronic service guide data.

9. The method according to claim 1, wherein the idle time is set to turn off an apparatus receiving the one or more data streams carrying the zapping data.

10. The method according to claim 9, wherein the apparatus is a mobile terminal.

11. The method according to claim 1, wherein the idle time is set as equal to or longer than 0.1 second.

12. The method according to claim 11, wherein the idle time is set as shorter than 10 seconds.

13. The method according to claim 11, wherein the idle time is set as shorter than 1 second.

14. The method according to claim 1, wherein the zapping data includes information for displaying a last saved still image of a first burst as a first still image of a subsequent burst before displaying the subsequent burst.

15. An apparatus comprising:
at least one processor; and
at least one memory including computer program code for one or more programs,
receive time slice bursts comprising program data and zapping data, wherein the zapping data includes content data, and at least two of the time slice bursts have an idle time therebetween during which the program data is not received;
process said zapping data; and
cause, at least in part, actions that result in displaying at least part of said zapping data as a response to a user action.

16. The apparatus according to claim 15, wherein the zapping data comprises video data.

17. The apparatus according to claim 16, wherein the video data comprises an intra-coded picture data.

18. The apparatus according to claim 17, wherein the selected intra-coded picture data is configured for synchronization to a start of a time slice burst.

19. The apparatus according to claim 18, wherein a flow label value for intra-coded picture data is used in the synchronization.

20. The apparatus according to claim 15, wherein at least one datagram from at least one data stream carrying the zapping data is included in a timeslice burst carrying program data from which the zapping data originates.

21. The apparatus according to claim 15, wherein the zapping data is one of a plurality of entries in an electronic service guide displayed on the apparatus.

22. The apparatus of claim 15, wherein the apparatus is further caused to cause, at least in part, actions that result in displaying visual data including video and still pictures included in the received time slice bursts; and
receive input selecting the visual data to be displayed;
wherein the selected visual data is displayed as a response to a user action.

23. The apparatus according to claim 15, wherein at least one datagram from one or more data streams carrying zapping data is included in a timeslice burst carrying electronic service guide data.

24. An apparatus comprising:
at least one processor; and
at least one memory including computer program code for one or more programs,
the at least one memory and the computer program code configured to, with the at least one processor, cause the apparatus to perform at least the following,
select one or more data items from one or more programs to be included in zapping data, the selected one or more data items including content data;
form from the selected one or more data items one or more data streams carrying the zapping data; and
transmit said one or more data streams carrying the zapping data as a series of time slice bursts having an idle time between transmission of at least two of the time slice bursts during which the one or more data streams are not transmitted.

25. The apparatus according to claim 24, wherein the selected zapping data comprises video data.

26. The apparatus according to claim 25, wherein the selected video data comprises an intra-coded picture data.

27. The apparatus according to claim 26, wherein the selected intra-coded picture data is synchronized to the start of a time slice burst.

28. The apparatus according to claim 27, wherein in the synchronization a flow label value for intra-coded picture data is used.

29. The apparatus according to claim 24, wherein at least one datagram from the one or more data streams carrying zapping data is included in a timeslice burst carrying program data.

30. The apparatus according to claim 24, wherein at least one of the IP streams carrying zapping data is transmitted as a burst.

31. The apparatus according to claim 24, wherein the zapping data is one of a plurality of entries in an electronic service guide.

32. The apparatus according to claim 24, wherein at least one datagram from the one or more data streams carrying zapping data is included in a timeslice burst carrying electronic service guide data.

33. A non-transitory computer-readable storage medium carrying one or more sequences of one or more instructions which, when executed by one or more processors, cause an apparatus to at least perform the following steps:
selecting one or more data items from one or more programs to be included in zapping data, the selected one or more data items including content data;
forming from the selected one or more data items one or more data streams carrying the zapping data; and
transmitting the one or more data streams carrying the zapping data as a series of time slice bursts having an idle time between transmission of at least two of the time slice bursts during which the one or more data streams are not transmitted.

34. A method comprising:
causing, at least in part, actions that result in reception of time slice bursts comprising program data and zapping data, wherein the zapping data includes content data, and at least two of the time slice bursts have an idle time therebetween during which the program data is not received;

processing said zapping data; and causing, at least in part, actions that result in displaying at least part of said zapping data as a response to a user action.

35. The method according to claim 34, wherein at least one datagram from at least one data stream carrying the zapping data is included in a timeslice burst carrying program data from which the zapping data originates.

36. The method according to claim 34, wherein the zapping data is one of a plurality of entries in an electronic service guide displayed on the apparatus.

37. The method according to claim 34, wherein the idle time is set to turn off the apparatus.

38. The method according to claim 37, wherein the apparatus is a mobile terminal.

39. The method according to claim 34, wherein the idle time is set as equal to or longer than 0.1 second.

40. The method according to claim 39, wherein the idle time is set as shorter than 10 seconds.

41. The method according to claim 39, wherein the idle time is set as shorter than 1 second.

42. The method according to claim 34, wherein the zapping data includes information for displaying a last saved still image of a first burst as a first still image of a subsequent burst before displaying the subsequent burst.

43. The method according to claim 34, wherein the zapping data comprises video data.

* * * * *